(12) United States Patent
McCandlish et al.

(10) Patent No.: US 10,815,154 B2
(45) Date of Patent: Oct. 27, 2020

(54) COMPOSITE MATERIALS, METHODS OF PRODUCTION AND USES THEREOF

(71) Applicant: Solidia Technologies, Inc., Piscataway, NJ (US)

(72) Inventors: Larry E. McCandlish, Piscataway, NJ (US); Orlando Narine, Piscataway, NJ (US); Daniel Castoro, Lincroft, NJ (US); Vahit Atakan, Princeton, NJ (US); Devin Patten, Red Bank, NJ (US); John P. Kuppler, Greenbrook, NJ (US); Sean Camron Quinn, Branchburg, NJ (US)

(73) Assignee: SOLIDIA TECHNOLOGIES, INC., Piscataway, NJ (US)

( * ) Notice: Subject to any disclaimer, the term of this patent is extended or adjusted under 35 U.S.C. 154(b) by 0 days.

(21) Appl. No.: 16/377,849

(22) Filed: Apr. 8, 2019

(65) Prior Publication Data

US 2019/0300433 A1    Oct. 3, 2019

Related U.S. Application Data

(60) Division of application No. 15/831,135, filed on Dec. 4, 2017, now Pat. No. 10,457,605, which is a
(Continued)

(51) Int. Cl.
*C04B 20/12* (2006.01)
*C04B 35/16* (2006.01)
(Continued)

(52) U.S. Cl.
CPC ............... *C04B 35/16* (2013.01); *B28B 1/00* (2013.01); *B28B 7/186* (2013.01); *B28B 11/245* (2013.01);
(Continued)

(58) Field of Classification Search
CPC . C04B 28/188; C04B 14/005; C04B 40/0231; C04B 20/12; C04B 28/10;
(Continued)

(56) References Cited

U.S. PATENT DOCUMENTS 2,621,027 A * 12/1952 Tatsch ...................... F24D 5/10
                                                    165/56
3,885,296 A *  5/1975 Stout ....................... E04B 1/161
                                                    29/433
(Continued)

FOREIGN PATENT DOCUMENTS

DE    10 2008 037 171 A1    2/2010
EA         201300991 A1     3/2014
(Continued)

OTHER PUBLICATIONS

International Search Report from PCT/US2017/064544, dated Jun. 9, 2020.
(Continued)

*Primary Examiner* — Babajide A Demuren
(74) *Attorney, Agent, or Firm* — Dentons US LLP

(57) ABSTRACT

The invention provides novel articles of composite materials having hollow interior channels or passageways, or otherwise being hollowed out, and formulations and methods for their manufacture and uses. These hollow core objects are suitable for a variety of applications in construction, pavements and landscaping, and infrastructure.

8 Claims, 20 Drawing Sheets

Related U.S. Application Data continuation-in-part of application No. 14/506,079, filed on Oct. 3, 2014, now Pat. No. 9,878,951.

(60) Provisional application No. 61/886,936, filed on Oct. 4, 2013.

(51) Int. Cl.
| | |
|---|---|
| *C04B 26/02* | (2006.01) |
| *C04B 35/628* | (2006.01) |
| *C04B 22/04* | (2006.01) |
| *C01B 33/24* | (2006.01) |
| *C04B 24/24* | (2006.01) |
| *B28B 1/00* | (2006.01) |
| *B28B 7/18* | (2006.01) |
| *B28B 11/24* | (2006.01) |
| *C04B 28/18* | (2006.01) |
| *E04B 5/02* | (2006.01) |
| *F27B 5/04* | (2006.01) |

(52) U.S. Cl.
CPC ............ *B28B 11/247* (2013.01); *C01B 33/24* (2013.01); *C04B 20/12* (2013.01); *C04B 22/04* (2013.01); *C04B 24/24* (2013.01); *C04B 26/02* (2013.01); *C04B 28/188* (2013.01); *C04B 35/62876* (2013.01); *E04B 5/02* (2013.01); *F27B 5/04* (2013.01)

(58) Field of Classification Search
CPC .......... C04B 14/043; C04B 2103/0067; C04B 2111/545; B28B 11/245; B28B 3/20; B28B 2003/203; Y02P 40/18
See application file for complete search history.

(56) References Cited

U.S. PATENT DOCUMENTS

| | | | | |
|---|---|---|---|---|
| 5,035,100 A | * | 7/1991 | Sachs .................. | B28B 11/0863 264/138 |
| 5,121,789 A | * | 6/1992 | Scharfe ................. | F24D 11/007 126/400 |
| 5,579,620 A | * | 12/1996 | Kuo ........................ | E04B 2/842 52/447 |
| 6,021,646 A | * | 2/2000 | Burley ................... | A63C 19/10 165/45 |
| 6,264,734 B1 | * | 7/2001 | Dickens ................. | C04B 28/26 106/600 |
| 6,651,011 B1 | * | 11/2003 | Bache ...................... | E04C 3/22 702/33 |
| 6,845,591 B1 | * | 1/2005 | van Paassen ............. | E04B 5/48 52/220.1 |
| 7,856,773 B2 | * | 12/2010 | Agaiby .................. | A63H 33/10 52/220.2 |
| 2005/0281984 A1 | * | 12/2005 | Van Erp .................... | E04C 3/20 428/166 |
| 2008/0142610 A1 | * | 6/2008 | Bastow ..................... | F24D 5/10 237/69 |

FOREIGN PATENT DOCUMENTS

| | | |
|---|---|---|
| EA | 201690671 A1 | 12/2016 |
| NL | 2007927 C | 6/2013 |
| WO | 2012/122031 A2 | 9/2012 |

OTHER PUBLICATIONS

Written Opinion of the ISA from PCT/US2017/064544, dated Jun. 9, 2020.
U.S. Appl. No. 15/831,135, filed Dec. 4, 2017 (U.S. Pat. No. 10,457,605).
U.S. Appl. No. 14/506,079, filed Oct. 3, 2014 (U.S. Pat. No. 9,878,951).

* cited by examiner

COMPOSITE MATERIALS, METHODS OF PRODUCTION AND USES THEREOF

PRIORITY CLAIMS AND RELATED PATENT APPLICATIONS

This application is Divisional application of and claims priority to U.S. patent application Ser. No. 15/831,135, filed Dec. 4, 2017, which claims the benefit of priority to U.S. utility application Ser. No. 14/506,079 filed on Oct. 3, 2014, which claim the benefit of priority to U.S. provisional application Ser. No. 61/886,936, filed on Oct. 4, 2013, the entire content of each of which is incorporated herein by reference in its entirety for all purposes.

FIELD OF THE INVENTION

The invention generally relates to articles of composite materials and systems and processes for making the same. More particularly, the invention relates to novel articles or assemblages of articles of composite materials (e.g., pavers, blocks, roof tiles and hollow core slabs), and formulations and methods for their manufacture and uses. These concrete-type objects are suitable for a variety of applications in construction, pavements and landscaping, and infrastructure.

BACKGROUND OF THE INVENTION

Concrete is the most consumed man-made material in the world. A typical concrete is made by mixing Portland cement, water and aggregates such as sand and crushed stone. Portland cement is a synthetic material made by burning a mixture of ground limestone and clay, or materials of similar composition in a rotary kiln at a sintering temperature of around 1,450° C.

Pavers are concrete blocks that are made by using a casting process, a pressing process, a compacting process, or a combination of vibration and pressing. Pavers are generally laid in interlocking pattern. These pavers are also sometime referred as paving stones. These pavers can be removed when damaged during service life with a new one reducing any service interruption. Interlocking pavers could be designed to have a gap between the patterns that provides for draining of water to sub layers.

ASTM C 936 provides criteria that concrete pavers need to satisfy but is not limited to the following: an average compressive strength of 8,000 psi; an average water absorption no greater than 5%; and resistance to at least 50 freeze-thaw cycles with average material loss not exceeding 1%. In addition to the ASTM requirements, one may also wish that the pavers satisfy additional requirements, including reduced efflorescence (e.g., reduced leaching out of reaction product due to concentration gradients); good color retention; and abrasion resistance depending on where the pavers are being used.

Like pavers, blocks are also pre-cast concrete produced either by casting or pressing processes, or similar compacting processes. Blocks are also referred to as concrete masonry units (CMUs), hollow blocks and concrete blocks. When these blocks are made with fly ash they are called cinder blocks. These blocks generally have a hollow structure. Artificial or man-made paving stones and construction block materials have been studied in efforts to replace the expensive and scarce natural material with low-cost, readily produced mimics. Such efforts, however, have yet to produce in a synthetic material that possesses the desired appearance, texture, density, hardness, porosity and other aesthetics characteristic of stone while at the same can be manufactured in large quantities at low cost with minimal environmental impact.

Blocks are expected to provide better structural property compared to clay bricks (for load bearing masonry structure), and a smoother surface when producing a masonry wall. In addition, interlocking concrete masonry units do not require mortar to bind the units. Some blocks can be used to build a hollow structure that results in good sound and thermal insulation as compared to a solid structure.

Blocks have to generally comply with the requirements of ASTM C90, Standard Specification for Loadbearing Concrete Masonry Units. Blocks that comply with this standard are ensured to be acceptable as regards strength, geometry, durability and fire resistance, and are generally acceptable for use in standard commercial construction projects.

Hollow-core slabs, sometimes referred to as voided slabs or hollow core planks, are precast slabs of concrete. They are often used in building constructions, for example, as floors, walls or roofs in multi-story buildings. The precast concrete slab typically has tubular voids extending the full length of the slab, making the slab lighter than a massive floor slab of equal thickness or strength. Reduced weight lowers material and transportation cost.

Typical slabs are about 120 cm wide with a standard thickness between 15 cm and 50 cm. The precast concrete I-beams between the holes contain steel wire ropes that provide bending resistance to bending moment from loads. The manufacturing process involves extruding wet concrete around the prestressed steel wire rope from a moving mold. After curing the continuous slab is cut according to the required lengths and width. Hollow-core floor slabs are also made in rebar reinforced concrete (not prestressed). Hollow-core wall panels are made without reinforcement.

Concrete products, however, are not optimal in terms of both economics and environmental impact. Existing production technologies involve large energy consumption and carbon dioxide emission, leading to unfavorable carbon footprints. Portland cement manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone.

Recently, a revolutionary form of cement that is based on carbonatable calcium silicate materials has emerged as a promising substitute to traditional cements. Production of carbonatable calcium silicate-based cements involves significantly reduced $CO_2$ emissions and energy consumption. In addition, this new cement sequesters $CO_2$ when cured into concrete products because $CO_2$ is needed to react with the carbonatable calcium silicate materials during the curing process to form concrete products.

Thus, there is an on-going need for novel and improved cement and concrete products and production technologies that can be mass applied at lower cost with improved energy consumption and more desirable carbon footprint.

SUMMARY OF THE INVENTION

The invention is based in part on the unexpected discovery of improved products and production technologies for manufacturing various concrete objects (e.g., pavers, blocks, roof tiles and hollow core slabs) from carbonatable calcium silicate. The manufactured products possess excellent physical and performance characteristics matching or exceeding existing concrete products including toughness, flexibility, abrasion resistance and durability.

The concrete objects of the invention can be readily produced from widely available, low cost raw materials by a process suitable for large-scale production with lower energy consumption, therefore enjoying desirable carbon footprints with minimal environmental impact. The raw materials include precursor materials such as particulate calcium silicate. The calcium silicate precursor material typically comprises a blend of discrete calcium silicate phases, selected from one or more of CS (wollastonite or pseudowollastonite), C3S2 (rankinite), C2S (belite or larnite or bredigite) and a calcium-silicate based amorphous phase comprising about 30% or more of the total phases, where "C" refers to calcium oxide or lime, wherein "S" refers to silicon dioxide or silica, along with certain traces of impurities that become bonding elements, and particulate filler materials (e.g., calcium oxide-containing material such as limestone, xonotlite, miro-silica, and quartz, lightweight aggregates such as perlite or vermiculite, or even industrial waste materials such as fly ash, bottom ash and slag). A fluid component is also provided as a reaction medium, comprising liquid water and/or water vapor and a reagent, carbon dioxide ($CO_2$), which is consumed in the production as a reactive species and ends up sequestered in the final product. The bonding elements react at controlled temperatures and pressures either using the process of hydration in which the reaction occurs between water and water vapor, or using water vapor and $CO_2$.

Depending on end user requirements, various other additives such as dispersing, rheology modifying admixtures (to improve mixture consistency), coloring pigments, retarders, and accelerators. Additive materials can include natural or recycled materials, and calcium carbonate-rich and magnesium carbonate-rich materials, as well as additives to the fluid component, such as a water-soluble dispersant.

In one aspect, the invention generally relates to an article of manufacture having a composite material distributed as a plurality of discrete concrete objects. One or more ducts or channels are arranged between or through the plurality of discrete concrete objects to form a fluid transport system within the one or more ducts or channels and/or with an exterior of the plurality of discrete objects. The composite material includes: a plurality of bonding elements, wherein, each bonding element having a core comprising primarily calcium silicate, a silica-rich first or inner layer, and a calcium carbonate-rich second or outer layer; and filler particles comprising coarse filler particles and/or fine filler particles. The plurality of bonding elements and the plurality of filler particles together form one or more bonding matrices and the bonding elements and the filler particles are substantially evenly dispersed therein and bonded together. In certain embodiments, the plurality of discrete concrete objects are arranged within an envelope or chamber.

In another aspect, the invention generally relates to a system for manufacturing an article. The system includes an envelope or chamber and enclosed therein, a composite material distributed as a plurality of discrete concrete objects. One or more ducts or channels are arranged between or through the plurality of discrete concrete objects forming a fluid transport system within the one or more ducts and channels and with an exterior of the plurality of discrete objects. The system also optionally includes one or more boards on which the plurality of discrete concrete objects is placed and one or more racks, tarps, walls or panels with planar, flat, convex or concave faces, that form one or more ducts or channels and facilitate a fluid flow profile in the fluid transport system.

In yet another aspect, the invention generally relates to a process for producing an article of manufacture. The process includes: mixing a particulate composition and a liquid composition to form a mixture; casting or extruding or otherwise forming the mixture in a mold to generate a casted or extruded or otherwise formed green body comprising a plurality of discrete concrete objects, wherein one or more ducts or channels are arranged between or through the plurality of discrete concrete objects and an exterior of the plurality of discrete objects; maintaining an atmosphere of $CO_2$ and/or water vapor in the one or more interior ducts or channels and the exterior of the plurality of discrete objects; and curing the plurality of discrete objects at a temperature in the range from about 20° C. to about 150° C. for about 1 hour to about 80 hours under an atmosphere of water and/or $CO_2$ having a pressure in the range from ambient atmospheric pressure to about 60 psi above ambient and having a $CO_2$ concentration ranging from about 10% to about 90%.

In certain embodiments, maintaining an atmosphere of $CO_2$ and/or water vapor in the one or more interior ducts or channels and/or the exterior of the plurality of discrete objects includes: containing the atmosphere within the one or more interior channels and/or the exterior of the plurality of discrete objects; circulating the contained atmosphere of $CO_2$ and/or water vapor; removing or adding water vapor to or from the contained atmosphere; and heating the contained atmosphere.

In yet another aspect, the invention generally relates to an article prepared by a process disclosed herein. The article of the invention may be of any suitable size or shape or for any suitable purposes, for example, selected from pavers, blocks, roof tiles, hollow core slabs, precast concrete objects with or without reinforcement.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
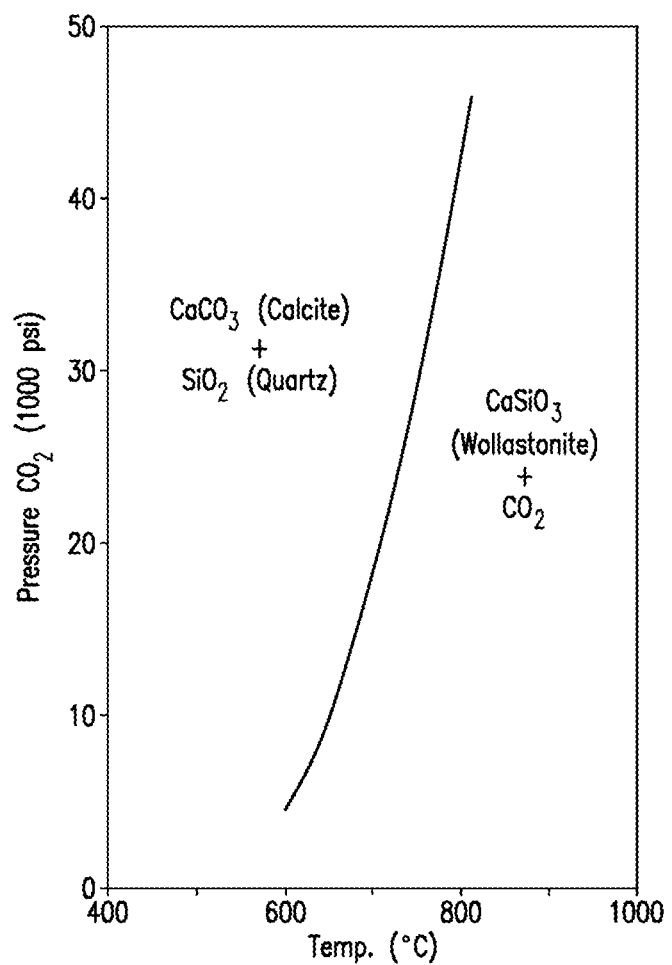
FIG. 1 is a pressure-temperature phase diagram showing the phases present in the reversible reaction $CaCO_3 + SiO_2 \leftrightarrow CaSiO_3$ (calcium silicate)$+CO_2$.
Figure 2:
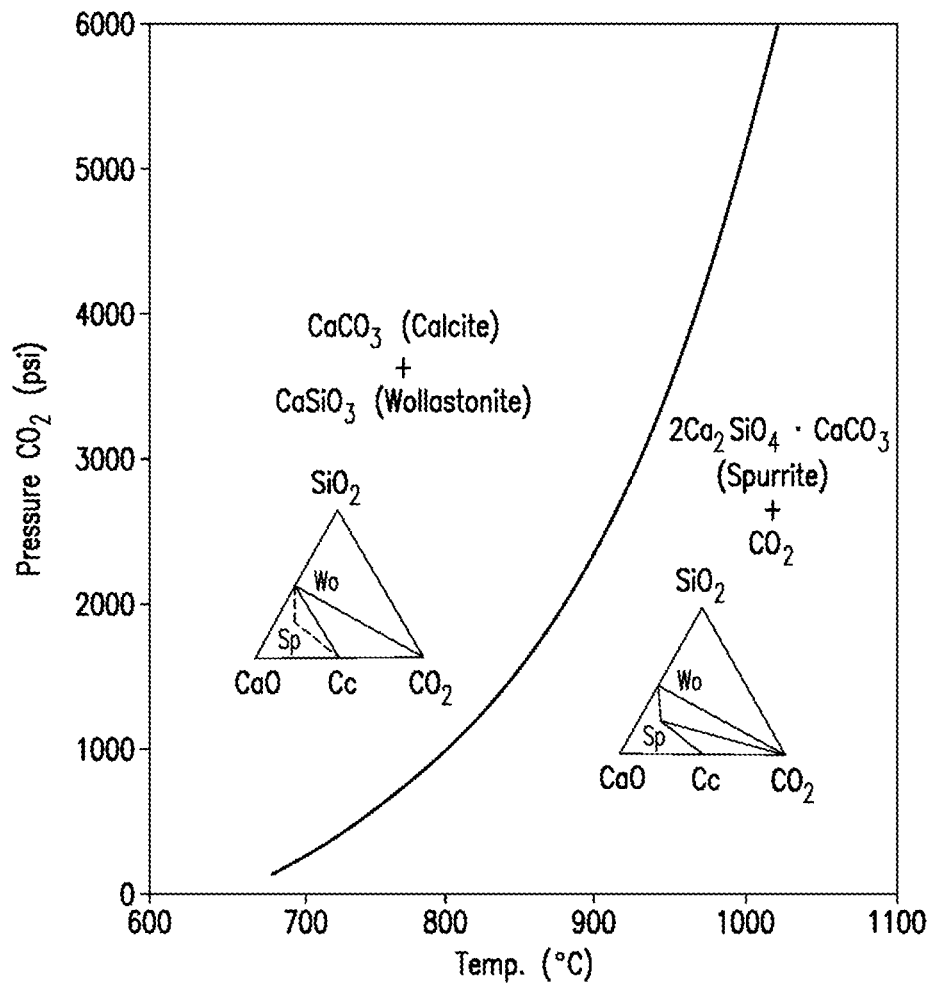
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
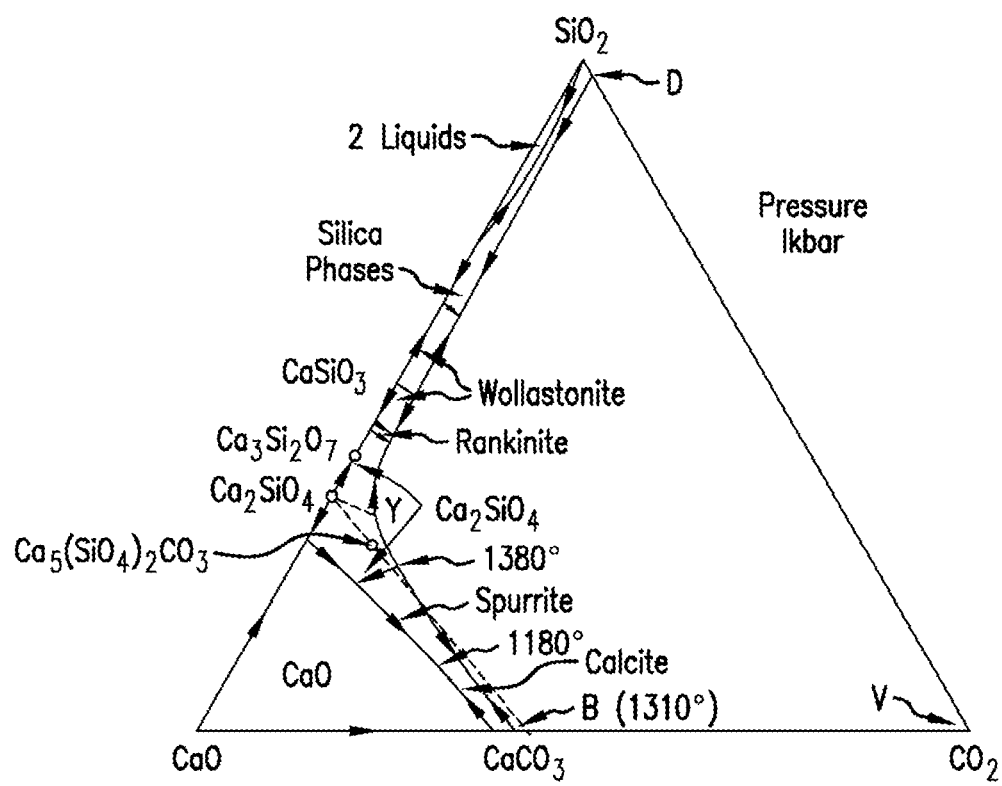
FIG. 3 is a phase diagram of the $CaO$—$SiO_2$—$CO_2$ system at a pressure of 1 kilobar.
Figure 4:
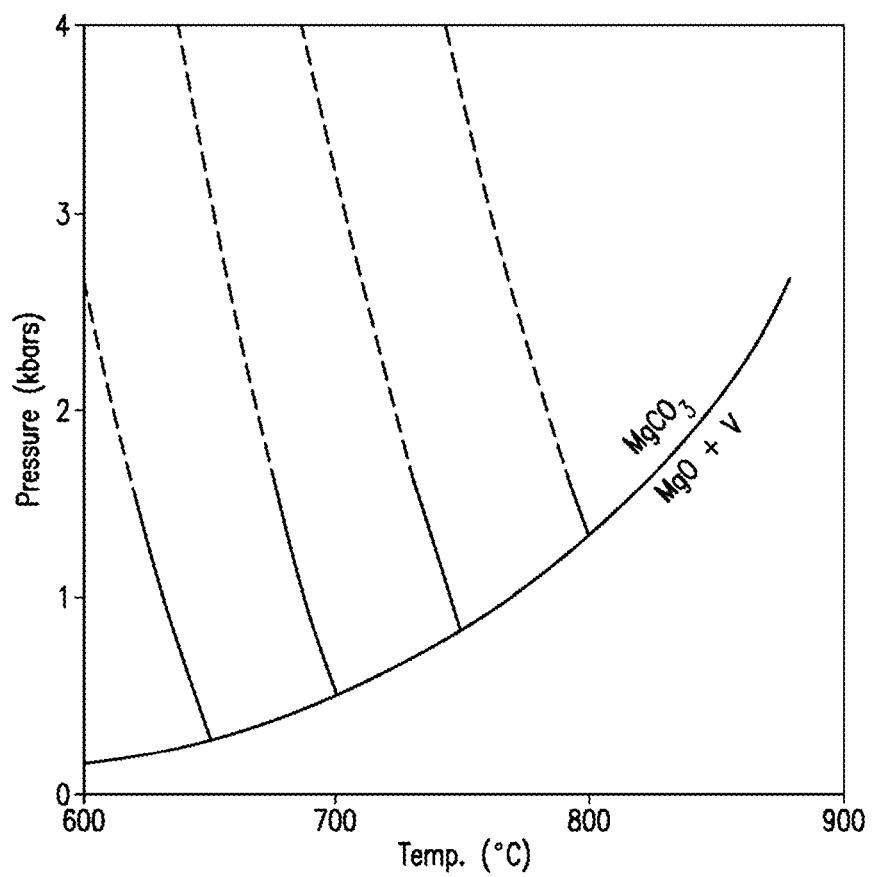
FIG. 4 is a pressure-temperature phase diagram showing the phases present in the reversible reaction $MgO + CO_2 \leftrightarrow MgCO_3$.
Figure 5:
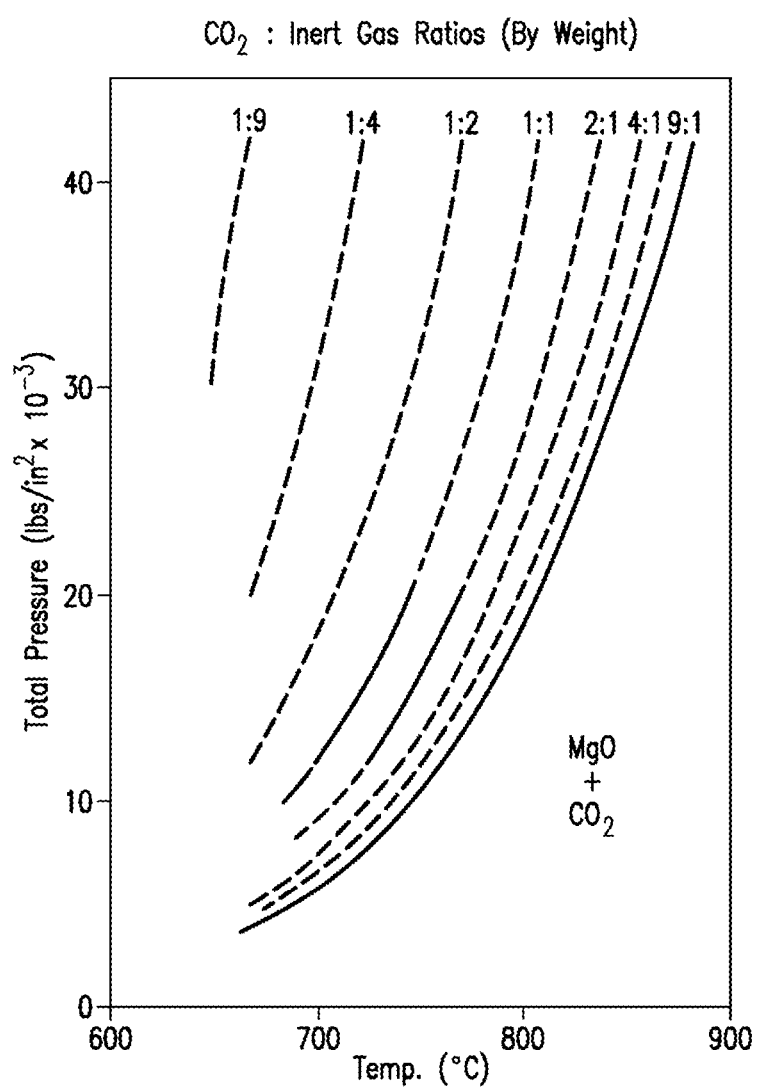
FIG. 5 is a pressure-temperature phase diagram showing the equilibrium curves for the reversible reaction $MgO + CO_2 \leftrightarrow MgCO_3$ as a function of the proportion of $CO_2$ in an inert gas.
Figure 6:
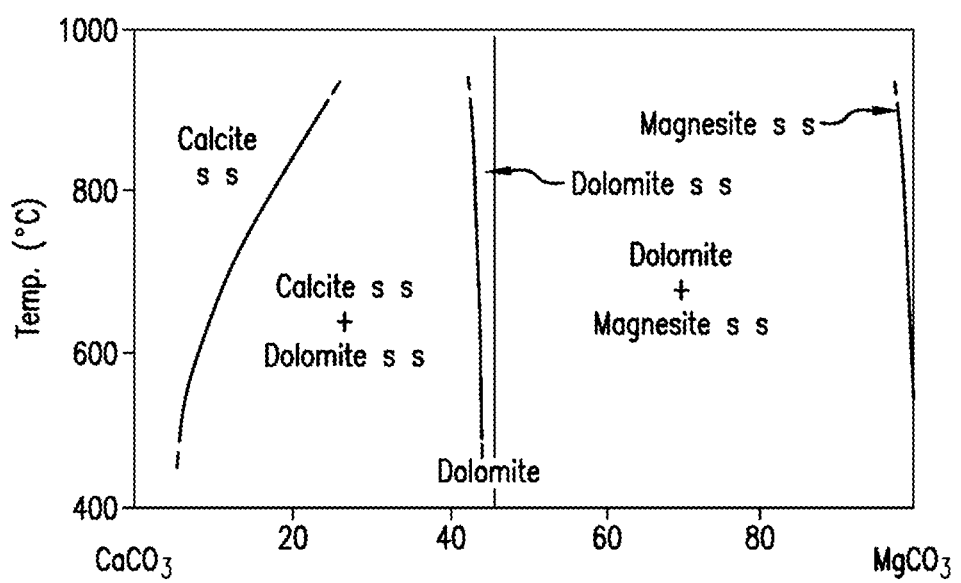
FIG. 6 is a temperature-composition phase diagram that illustrates the stability regions for various phases in the $CaCO_3$—$MgCO_3$ system.
Figure 7:
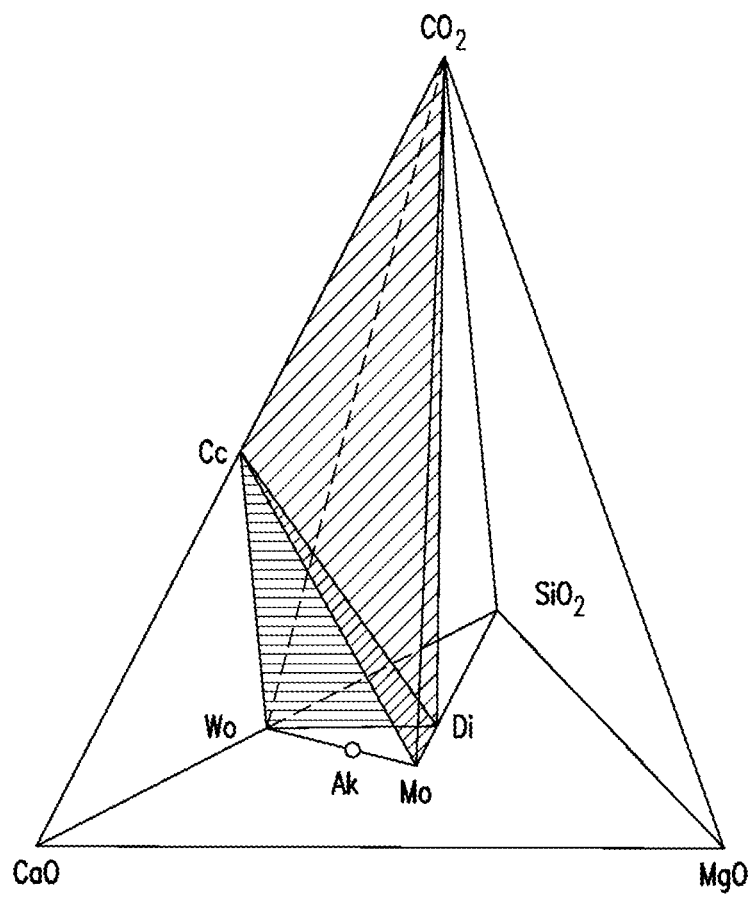
FIG. 7 is a tetrahedron diagram illustrating the phase relationships among the compounds $CaO$, $MgO$, $SiO_2$ and $CO_2$, and showing the $CO_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite ($CaMgSiO_4$).
Figure 8:
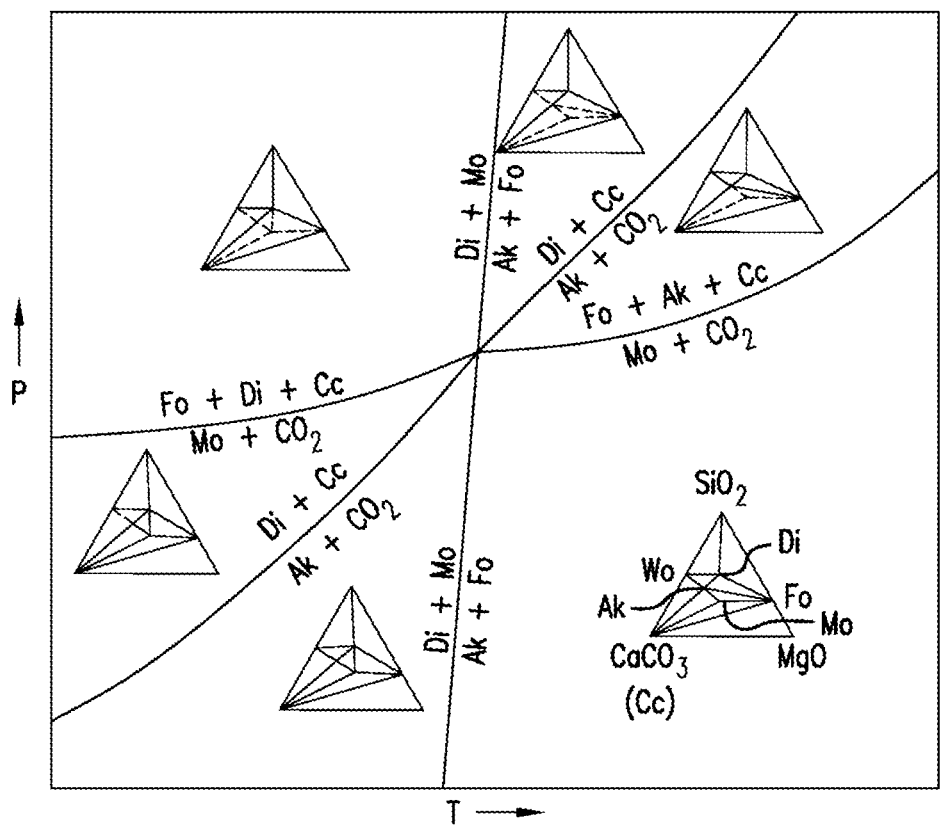
FIG. 8 is a pressure-temperature phase diagram illustrating the phase relationships among the compounds CaO, MgO, $SiO_2$ and $CO_2$, with univariant curves emanating from the quaternary invariant point involving the phases calcite (Cc), diopside (Di), forsterite (Fo), monticellite (Mo), Akermanite (Ak), and $CO_2$. The inset is the phase diagram for the three compound systems of $CaCO_3$, MgO and $SiO_2$.

The invention provides exceptional concrete objects possessing excellent physical and performance characteristics matching or exceeding existing concrete objects. The concrete objects of the invention can be readily produced from widely available, low cost raw materials by a process suitable for large-scale production with improved energy consumption, reduced production cycle (e.g., less curing time), and more desirable carbon footprint. The production method of the invention consumes large quantities of $CO_2$ resulting in a $CO_2$ sequestrated product thereby making it carbon-neutral and environmentally friendly. Concrete objects herein refer to objects and articles with geometries typical for the consumer market including but not limited to: pavers, bricks, segmented retaining wall, wet-cast stone slabs, concrete masonry units (CMU), or concrete hollow-core objects. Hollow-core objects herein refer to objects and articles having hollow cores, channels or otherwise being hollowed out (for example, to reduce diffusion distances and facilitate curing).

The concrete objects of the invention can be use as various building and construction components including, for example, pavements, floors, roofs, walls, doors, tablets, bridges, frames, pathways, barriers, linings, foundations, fences, sound barriers, pipes, culverts utility vaults, septic tanks, dry wells, and storm drains. They may be manufactured with or without embedded reinforcement elements (e.g., pre-tensioned and/or post-tensioned and/or pre-stressed), features that increase the capacity and durability of the articles. Reinforcement elements where present may be solid bars, wires or cables made with materials of desired characteristics, for example, steel, polymeric materials, glass, or a combination thereof.

In one aspect, the invention generally relates to an article of manufacture having a composite material distributed as a plurality of discrete concrete objects. One or more ducts or channels are arranged between or through the plurality of discrete concrete objects to form a fluid transport system within the one or more ducts or channels and/or with an exterior of the plurality of discrete objects. The composite material includes: a plurality of bonding elements, wherein, each bonding element having a core comprising primarily calcium silicate, a silica-rich first or inner layer, and a calcium carbonate-rich second or outer layer; and filler particles comprising coarse filler particles and/or fine filler particles. The plurality of bonding elements and the plurality of filler particles together form one or more bonding matrices and the bonding elements and the filler particles are substantially evenly dispersed therein and bonded together.

A key feature of an article of the invention is that ducts or channels (including hollow space) creates interior volumes whose thicknesses are small compared to the overall volume of the article. Access for the curing fluid to faces on sides of the interior volume significantly increases the surface area over which carbon dioxide and water must diffuse to affect curing. In addition, for monolithic bodies, the ducts or channels reduce the overall material use and product weight, resulting in savings in materials and other associated cost in transportation and installation.

In certain embodiments, the plurality of discrete concrete objects are arranged within chamber or envelope. For the purposes of this disclosure, the terms "chamber" and "envelope" are used interchangeably.

Concrete objects when produced in mass can be arranged and/or orientated by the forming process or during the curing chamber loading process so that interior or exterior faces are arrayed to maximize the exposure to the curing fluid (e.g., $CO_2$ and water vapor) and to minimize the diffusion distance of $CO_2$ and water relative to the total volume of the discrete objects. Arrangement of the interior or exterior faces of the discrete objects relative to the fluid flow profile is a critical consideration for ensuring a uniform and/or fast curing process.

The discrete objects can be arrayed in a curing chamber with respect to the fluid flow profile to maximize carbon dioxide and water diffusion. The spacing between concrete objects arrayed in the chamber can be manipulated to create channels parallel to the fluid flow while maintaining a similar envelope volume of concrete. The concentration of fluid flow in the channels where the faces of the discrete objects are exposed improves curing uniformity and/or speed. The geometry of the discrete objects and the fluid flow profile of the curing system determines the optimum inter-object spacing, object orientation, and spacing between the discrete objects and the fluid distribution system to induce a high carbon dioxide and water diffusion rates across the channel-forming object faces.

Manipulation of the spacing between the concrete objects arrayed in the chamber and chamber components such as racks, boards and the fluid distribution components such as gas inlets, outlets, plenums, or perforated plates can create channels between the faces of the concrete object faces and the chamber components.

Faces of the discrete objects in the proximity of the chamber features such as racks create channels adjacent to and/or between the discrete objects and the chamber, where fluid flow is concentrated. The concentration of fluid flow in the channels between the discrete object faces and the chamber components improves curing uniformity and speed. The geometry of the discrete objects and the fluid flow profile of the curing system determines the optimum object orientation, spacing between the discrete objects and the chamber components, and spacing between the discrete objects and the fluid distribution system to induce high carbon dioxide and water diffusion rates across the channel-forming discrete object faces and the chamber components.

In certain embodiments, each of the plurality of discrete concrete objects does not comprise any reinforcement elements.

In certain embodiments, each of the plurality of discrete concrete objects comprises one or more reinforcement elements embedded therein.

In certain embodiments, the one or more reinforcement elements are selected from bars, wires and cables. The one or more reinforcement bars may be made of any suitable materials, for example, iron, steel, polymeric materials, glass, or a combination thereof.

In certain embodiments, the plurality of bonding elements are chemically transformed from a ground calcium silicate composition, including one or more of natural or synthetic wollastonite, pseudo-wollastonite, rankinite, gehlenite, belite, alite and amorphous phase.

In certain embodiments, the gas comprises carbon dioxide. In certain embodiments, the plurality of bonding elements are prepared by a chemical transformation from ground calcium silicate by reacting it with $CO_2$ via a controlled hydrothermal liquid phase sintering process.

In certain embodiments, the gas comprises carbon dioxide. In certain embodiments, the plurality of bonding elements are chemically transformed from a precursor calcium silicate other than synthetic wollastonite or pseudo-wollastonite.

In certain embodiments, the weight ratio of bonding elements : filler particles is about 1:5.

In certain embodiments, the plurality of discrete concrete objects have a water absorption of less than about 10%.

In certain embodiments, the fluid transport system is adapted to flowing a gas through the one or more ducts or channels and the exterior of the plurality of discrete objects.

In certain embodiments, the fluid that flows through the one or more ducts or channels and the exterior of the plurality of discrete objects changes it direction at least once.

In certain embodiments, the fluid that flows through the one or more ducts or channels and the exterior of the plurality of discrete objects changes its velocity at least once.

In certain embodiments, the fluid transport system within the exterior of the plurality of discrete objects comprises of a flow between the envelope or chamber or a chamber component within the envelope or chamber.

Any suitable calcium silicate composition may be used as a precursor for the bonding elements. As used herein, the term "calcium silicate composition" generally refers to naturally-occurring minerals or synthetic materials that are comprised of one or more of a group of calcium silicate phases including CS (wollastonite or pseudowollastonite, and sometimes formulated $CaSiO_3$ or $CaO \cdot SiO_2$), C3S2 (rankinite, and sometimes formulated as $Ca_3Si_2O_7$ or $3CaO \cdot 2SiO_2$), C2S (belite, $\beta\text{-}Ca_2SiO_4$ or larnite, $\beta\text{-}Ca_2SiO_4$ or bredigite, $\alpha\text{-}Ca_2SiO_4$ or $\gamma\text{-}Ca_2SiO_4$, and sometimes formulated as $Ca_2SiO_4$ or $2CaO \cdot SiO_2$), a calcium-silicate based amorphous phase, each of which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

Calcium silicate compositions may contain amorphous (non-crystalline) calcium silicate phases in addition to the crystalline phases described above. The amorphous phase may additionally incorporate Al, Fe and Mg ions and other impurity ions present in the raw materials. The calcium silicate compositions may also include small quantities of residual CaO (lime) and $SiO_2$ (silica). The calcium silicate composition may also include small quantities of C3S (alite, $Ca_3SiO_5$).

The calcium silicate compositions may also include quantities of inert phases such as melilite type minerals (melilite or gehlenite or akermanite) with the general formula (Ca, Na,K)$_2$[(Mg, $Fe^{2+}$,$Fe^{3+}$,Al,Si)$_3O_7$] and ferrite type minerals (ferrite or brownmillerite or C4AF) with the general formula $Ca_2(Al,Fe^{3+})_2O_5$. In certain embodiments, the calcium silicate composition is comprised only of amorphous phases. In certain embodiments, the calcium silicate comprises only of crystalline phases. In certain embodiments, some of the calcium silicate composition exists in an amorphous phase and some exists in a crystalline phase.

It is noted that preferably the calcium silicate compositions of the invention do not hydrate. However, minor amounts of hydratable calcium silicate phases (e.g., C2S, C3S and CaO) may be present. C2S exhibits slow kinetics of hydration when exposed to water and is quickly converted to $CaCO_3$ during $CO_2$ curing processes. C3S and CaO hydrate quickly upon exposure to water and thus should be limited to <5% by mass.

In certain preferred embodiments, the molar ratio of elemental Ca to elemental Si of the calcium silicate composition is from about 0.80 to about 1.20. In certain preferred embodiments, the molar ratio of Ca to Si of the composition is from about 0.85 to about 1.15. In certain preferred embodiments, the molar ratio of Ca to Si of the composition is from about 0.90 to about 1.10. In certain preferred embodiments, the molar ratio of Ca to Si of the composition is from about 0.95 to about 1.05. In certain preferred embodiments, the molar ratio of Ca to Si of the composition is from about 0.98 to about 1.02. In certain preferred embodiments, the molar ratio of Ca to Si of the composition is from about 0.99 to about 1.01.

The metal oxides of Al, Fe and Mg contained within the calcium silicate composition are generally controlled to be less than about 30%. In certain preferred embodiments, the composition has about 20% or less of metal oxides of Al, Fe and Mg by total oxide mass. In certain preferred embodiments, the composition has about 15% or less of metal oxides of Al, Fe and Mg by total oxide mass. In certain preferred embodiments, the composition has about 12% or less of metal oxides of Al, Fe and Mg by total oxide mass. In certain preferred embodiments, the composition has about 10% or less of metal oxides of Al, Fe and Mg by total oxide mass. In certain preferred embodiments, the composition has about 5% or less of metal oxides of Al, Fe and Mg by total oxide mass.

Each of these calcium silicate phases is suitable for carbonation with $CO_2$. Hereafter, the discrete calcium silicate phases that are suitable for carbonation will be referred to as reactive phases.

The various reactive phases may account for any suitable portions of the overall reactive phases. In certain preferred embodiments, the reactive phases of CS are present at about 10 to about 60 wt % (e.g., about 15 wt % to about 60 wt %, about 20 wt % to about 60 wt %, about 25 wt % to about 60 wt %, about 30 wt % to about 60 wt %, about 35 wt % to about 60 wt %, about 40 wt % to about 60 wt %, about 10 wt % to about 50 wt %, about 10 wt % to about 40 wt %, about 10 wt % to about 30 wt %, about 10 wt % to about 25 wt %, about 10 wt % to about 20 wt %); C3S2 in about 5 to 50 wt % (e.g., about 10 wt % to 50 wt %, about 15 wt % to 50 wt %, about 20 wt % to 50 wt %, about 30 wt % to 50 wt %, about 40 wt % to 50 wt %, about 5 wt % to 40 wt %, about 5 wt % to 30 wt %, about 5 wt % to 25 wt %, about 5 wt % to 20 wt %, about 5 wt % to 15 wt %); and C2S in about 5 wt % to 60 wt % (e.g., about 10 wt % to about 60 wt %, about 20 wt % to about 60 wt %, about 25 wt % to about 60 wt %, about 30 wt % to about 60 wt %, about 35 wt % to about 60 wt %, about 40 wt % to about 60 wt %, about 5 wt % to about 50 wt %, about 5 wt % to about 40 wt %, about 5 wt % to about 30 wt %, about 5 wt % to about 25 wt %, about 5 wt % to about 20 wt %, about 5 wt % to about 20 wt %), and C in about 0 wt % to 3 wt % (e.g., 0 wt %, 1 wt % or less, 2 wt % or less, 3 wt % or less, about 1 wt % to 2 wt %, about 1 wt % to 3 wt %, about 2 wt % to 3 wt %).

In certain embodiments, the reactive phases comprise a calcium-silicate based amorphous phase, for example, at about 40% or more (e.g., about 45% or more, about 50% or more, about 55% or more, about 60% or more, about 65% or more, about 70% or more, about 75% or more, about 80% or more, about 85% or more, about 90% or more, about 95% or more) by mass of the total phases. It is noted that the amorphous phase may additionally incorporate impurity ions present in the raw materials.

The calcium silicate compositions of the invention are suitable for carbonation with $CO_2$. In particular, the composition of calcium silicate is suitable for carbonation with $CO_2$ at a temperature of about 30° C. to about 90° C. to form $CaCO_3$ with mass gain of about 20% or more. The mass gain reflects the net sequestration of $CO_2$ in the carbonated products. In certain preferred embodiments, the composition is suitable for carbonation with $CO_2$ at a temperature of about 30° C. to about 90° C. (e.g., about 40° C. to about 90° C., about 50° C. to about 90° C., about 60° C. to about 90° C., about 30° C. to about 80° C., about 30° C. to about 70° C., about 30° C. to about 60° C., about 40° C. to about 80° C., about 40° C. to about 70° C., about 40° C. to about 60° C.) to form $CaCO_3$ with mass gain of 10% or more (e.g., 15% or more, 20% or more, 25% or more, 30% or more).

Precursor calcium silicate compositions are typically used in powder form having a mean particle size (d50) of about 8 μm to about 25 μm, with 10% of particles (d10) sized below about 0.1 μm to about 3 μm, and 90% of particles (d90) sized above about 35 μm to about 100 μm.

In certain embodiments, the ratio of d90:d10 is selected to allow improved powder flow or decreased water demand for casting. In certain embodiments, the ratio of d50:d10 is selected to allow improved reactivity, improved packing, or decreased water demand for casting. In certain embodiments, the ratio of d90:d50 is selected to allow improved the reactivity, improved packing, or decreased water demand for casting.

Any suitable filler particles may be used, for example, calcium oxide-containing or silica-containing materials. Exemplary filler particles include lime, quartz (including sand), wollastonite, xonotlite, burned oil shale, fly- or volcanic-ash, stack dust from kilns, ground clay, pumice dust. Materials such as industrial waste materials (e.g., fly ash, slag, silica fume) may also be used as fillers. In certain preferred embodiments, light-weight aggregates such as perlite or vermiculite may also be used as fillers. In certain preferred embodiments, filler particles are made from a calcium oxide-rich material such as ground lime.

The filler particles comprise calcium oxide or silica and have a particle size ($d_{50}$) in the range from about 0.25 µm to about 200 µm (e.g., from about 0.25 µm to about 150 µm, from about 0.25 µm to about 100 µm, from about 0.25 µm to about 50 µm, from about 0.25 µm to about 20 µm, from about 0.25 µm to about 10 µm, from about 0.5 µm to about 200 µm, from about 1 µm to about 200 µm, from about 5 µm to about 200 µm, from about 10 µm to about 200 µm, from about 20 µm to about 200 µm, from about 50 µm to about 200 µm).

In certain embodiments, the filler particles are selected from fly ash, bottom ash, slag having particle sizes ranging from about 0.5 µm to about 300 µm (e.g., from about 1 µm to about 300 µm, from about 5 µm to about 300 µm, from about 10 µm to about 300 µm, from about 50 µm to about 300 µm, from about 100 µm to about 300 µm, from about 0.5 µm to about 200 µm, from about 0.5 µm to about 100 µm, from about 0.5 µm to about 50 µm, from about 0.5 µm to about 20 µm, from about 0.5 µm to about 10 µm, from about 0.5 µm to about 5 µm).

In exemplary embodiments of carbonation of the calcium silicate composition of the invention, ground calcium silicate particles used have a particle size having a cumulative 10% diameter greater than 1 µm in the volume distribution of the particle size distribution.

In certain embodiments, the filler particles are selected from limestone, miro-silica, and quartz having particle sizes ranging from about 1 µm to about 500 µm (e.g., from about 1 µm to about 400 µm, from about 1 µm to about 300 µm, from about 1 µm to about 200 µm, from about 1 µm to about 100 µm, from about 1 µm to about 50 µm, from about 1 µm to about 30 µm, from about 5 µm to about 500 µm, from about 10 µm to about 500 µm, from about 20 µm to about 500 µm, from about 50 µm to about 500 µm, from about 100 µm to about 500 µm, from about 200 µm to about 500 µm).

In certain embodiments, the filler particles are selected from lightweight aggregates having particle sizes ranging from about 20 µm to about 500 µm (e.g., from about 20 µm to about 400 µm, from about 20 µm to about 300 µm, from about 20 µm to about 200 µm, from about 20 µm to about 100 µm, from about 50 µm to about 500 µm, from about 100 µm to about 500 µm, from about 200 µm to about 500 µm, from about 300 µm to about 500 µm).

In certain embodiments, the set-controlling admixture is selected from a gluconate and sucrose. In certain embodiments, the dispersing/viscosity-modifying agent is a polycarboxilate based material.

In exemplary embodiments, the ground calcium silicate is ground wollastonite, the filler particles comprises ground limestone, and silica, the activating-agent is ground lime, the set-controlling admixture is a gluconate, the viscosity-modifying agent is a polycarboxilate based material, and the aerating agent is aluminum paste.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc"), which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

The term "quartz", as used herein, refers to any $SiO_2$-based material, including common sands (construction and masonry), as well as glass and recycled glass. The term also includes any other recycled natural and synthetic materials that contain significant amounts of $SiO_2$ (e.g., mica sometimes formulated as $KAl_2(AlSi_3O_{10})(OH)_2$.

In another aspect, the invention generally relates to a system for manufacturing an article. The system includes an envelope or chamber and enclosed therein, a composite material distributed as a plurality of discrete concrete objects. One or more ducts or channels are arranged between or through the plurality of discrete concrete objects forming a fluid transport system within the one or more ducts and channels and with an exterior of the plurality of discrete objects. The system also optionally includes one or more boards on which the plurality of discrete concrete objects are placed and one or more racks, tarps, walls or panels with planar, flat, convex or concave faces, that form one or more ducts or channels and facilitate a fluid flow profile in the fluid transport system.

In certain embodiments, the system includes a fluid distribution component that controls the fluid flow profile of at least a portion of the envelope or chamber.

In certain embodiments, the system includes a fluid distribution component that controls the fluid flow profile throughout the envelope or chamber.

In certain embodiments, the fluid distribution component that controls the fluid flow profile throughout the envelope or chamber changes the direction of the gas flow at least once.

In certain embodiments, the fluid distribution component that controls the fluid flow profile throughout the envelope or chamber changes the velocity of the gas flow at least once.

In certain embodiments, the fluid distribution component comprises one or more of fluid inlets, outlets, plenums, or perforated plates, or combinations thereof.

In certain embodiments, the envelope or chamber is made of a material selected from, a metal, alloy, plastic, polymer, polymeric composite, ceramic composite, or combinations thereof. In some embodiments, the envelope or chamber is made of concrete material, or, steel, or tarp, or combinations thereof.

In yet another aspect, the invention generally relates to a process for producing an article of manufacture. The process includes: mixing a particulate composition and a liquid composition to form a mixture; casting or extruding or otherwise forming the mixture in a mold to generate a casted or extruded or otherwise formed green body comprising a plurality of discrete concrete objects, wherein one or more ducts or channels are arranged between or through the plurality of discrete concrete objects and an exterior of the plurality of discrete objects; maintaining an atmosphere of $CO_2$ and/or water vapor in the one or more interior ducts or channels and the exterior of the plurality of discrete objects; and curing the plurality of discrete objects at a temperature in the range from about 20° C. to about 150° C. for about 1 hour to about 80 hours under an atmosphere of water and/or $CO_2$ having a pressure in the range from ambient atmospheric pressure to about 60 psi above ambient and having a $CO_2$ concentration ranging from about 10% to about 90%.

In certain embodiments, maintaining an atmosphere of $CO_2$ and/or water vapor in the one or more interior ducts or channels and/or the exterior of the plurality of discrete objects includes: containing the atmosphere within the one or more interior channels and/or the exterior of the plurality of discrete objects; circulating the contained atmosphere of $CO_2$ and/or water vapor; removing or adding water vapor to or from the contained atmosphere; and heating the contained atmosphere.

In certain embodiments, maintaining an atmosphere of $CO_2$ and/or water vapor in the one or more interior ducts or channels comprises changing the direction or velocity of the fluid flow of $CO_2$ and/or water vapor at least once during the period of curing the body.

In certain embodiments, the particulate composition includes a ground calcium silicate, comprising one or more of natural or synthetic wollastonite, pseudo-wollastonite, rankinite, gehlenite, belite, and alite and having a median particle size in the range from about 1 μm to about 100 μm and the liquid composition comprises water.

In certain embodiments, curing the casted mixture is performed at a temperature equal to or lower than about 60° C. for about 10 to about 50 hours under a vapor comprising water and $CO_2$ and having an ambient atmospheric pressure.

In certain embodiments, the ground calcium silicate is substantially that of ground wollastonite.

In certain embodiments, the process further includes embedding one or more reinforcement elements in the mixture.

The one or more reinforcement bars may be made of any suitable materials, for example, iron, steel, polymeric materials, glass, or a combination thereof.

The one or more reinforcement elements may be any suitable size and shape, for example, in the form of bars, wires and cables.

In yet another aspect, the invention generally relates to an article prepared by a process disclosed herein.

The article may be of any suitable size or shape or for any suitable purposes, for example, selected from pavers, blocks, roof tiles, hollow core slabs, precast concrete objects with or without reinforcement.

The one or more ducts or channels (including hollow spaces) is an important feature and affects the overall characteristics and performance of the discrete objects, including overall weight, mechanical properties, and functionalities. The discrete objects, along with the chamber components and the chamber itself, may form any suitable number of ducts or channels in pre-designed pattern and inter-connectivity. These ducts or channels may take any suitable sizes and shapes (e.g., circular, oval, polygonal, rectangular or square). They may be arranged in any suitable pattern or inter-connectivity.

The number, shape, size and configuration of the ducts and channels will impact various mechanical properties of the hollow core articles. As discussed in more details herein, the number, shape, size and configuration of the ducts and channels can also be utilized to the advantages of the manufacturing, for example, to speed up the curing process and to achieve more uniform curing.

The volume of the ducts or channels may account for any suitable fraction of the volume of the plurality of discrete objects dependent on the product mold geometry and any post-forming changes to product spacing, for example, from about 5 vol. % to about 95 vol. % (e.g., from about 10 vol. % to about 95 vol. %, from about 20 vol. % to about 95 vol. %, from about 30 vol. % to about 95 vol. %, from about 50 vol. % to about 95 vol. %, from about 70 vol. % to about 95 vol. %, from about 5 vol. % to about 90 vol. %, from about 5 vol. % to about 70 vol. %, from about 5 vol. % to about 50 vol. %, from about 5 vol. % to about 30 vol. %, from about 5 vol. % to about 20 vol. %) of the overall volume of the plurality of concrete objects.

The discrete objects of the invention can be manufactured to various sizes and dimensions. Typical dry-cast pavers range in height from 40 mm to 120 mm and may be pressed in an area up to 1.45 m×1.45 m resulting in a distribution of a plurality of concrete objects with a volume of up to 0.26 $m^3$ per production board. For example, typical dry-cast concrete masonry units (CMUs) are 200 mm in height and may be pressed in an area up 1.45 m×1.45 m resulting in a distribution of a plurality of concrete objects with a volume of up to 0.43 $m^3$ per production board. The number, shape, size and configuration of the channels can be utilized to enhance the manufacturing process by improving the speed and uniformity of curing.

In certain embodiments where the discrete objects are pavers, the dimensions are in the ranges of 1" to 24" in length, 1" to 24" in width, and 0.5" to 6" in height. In certain embodiments, the dimensions are in the ranges of 4" to 12" in length, 4" to 12" in width, and 1.5" to 5" in height.

In certain embodiments where the discrete objects are blocks, the dimensions are in the ranges of 7½" to 16" in length, 3½" to 12" in width, and 4" to 16" in height. In certain embodiments, the dimensions are in the range of 7½" to 16" in length, 3½" to 12" in width, and 6" to 12" in height.

In certain embodiments where the discrete objects are roof tiles, the dimensions are in the ranges of 2" to 24" in length, 2" to 24" in width, and 0.25" to 2" in thickness. In certain embodiments, the dimensions are in the range of 4" to 12" in length, 4" to 12" in width, and 0.25" to 1" in thickness.

In certain embodiments where the discrete objects are slabs, the dimensions are in the ranges of 4" to 48" in length, 4" to 48" in width, and 1.5" to 5" in height. In certain embodiments, the dimensions are in the ranges of 4" to 48" in length, 4" to 48" in width, and 1.5" to 5" in height, and are typically have a footprint larger than 144 inches squared.

The discrete objects are typically pressed onto a production board in such a manner to maximize the concrete volume produced per board. When products of uniform lateral geometry are produced, parallel gaps between objects are left, resulting in channels between the plurality of discrete objects. The number, shape, size and configuration of the channels can also be utilized to the advantages of the manufacturing, for example, to speed up the curing process and to achieve more uniform curing.

The plurality of concrete objects, are loaded in a regular manner into the chamber. In some embodiments, the curing chamber forms the chamber or envelope. Within the chamber, boards are stacked and arranged for curing. In the chamber, the orientation and spacing of boards may be manipulated to produce channels consisting of an exterior plane of the plurality of discrete objects, consisting of a number of individual object faces, and a chamber component, such as another stacked production board, where fluid flow can be directed. The geometry of the discrete objects and the fluid flow profile of the curing chamber determines the optimum object orientation, spacing between the objects and the chamber components, and spacing between the objects and the fluid distribution system to induce high carbon dioxide and water diffusion rates across the channel-forming object faces.

In certain embodiments, the concrete mold used to produce a set of discrete objects is modified to change the spacing between the plurality of the discrete objects according the chambers flow distribution profile and improve the carbon dioxide and water diffusion rates across the channel-forming object faces.

In certain embodiments, the discrete objects are separated or otherwise moved following the forming operation to change the spacing between concrete objects according the chambers flow distribution profile and improve the improve the carbon dioxide and water diffusion rates across the channel-forming object faces.

In certain embodiments, the product board spacing and/or the product board orientation, can be adjusted relative to the fluid distribution system to increase the fluid flow through the channel created by the exterior of the faces of the plurality of the discrete objects and the envelope and the plurality of the discrete objects and the chamber components. This increases carbon dioxide and water diffusion rates between the associated exterior faces of the plurality of the discrete objects and the chamber and the associated exterior faces of the plurality of the discrete objects and the chamber components.

In certain embodiments, the step of forming a mixture includes/involves mixing aggregates, sand, calcium silicate and water in a mixer. The mixer may be any mixer of a type typically used in mixing conventional concrete. Aggregates, sand and enough water to slightly wet the solids are thoroughly mixed. Next, calcium silicate is added to the batch along with the remaining water and any admixtures. The mixture is thoroughly mixed and the water adjusted to achieve the desired moisture level.

In certain preferred embodiments, the step of casting or extruding the slurry mixture in a mold configured to generate a casted or extruded or otherwise formed body having one or more interior ducts or channels includes/involves pouring the mixture into the mold or the extrusion machine. For example, in the case of making a casting, the mixture may be vibrated by vibrating the mold or by inserting vibrating wands into the mixture within the mold in order to facilitate removal of entrapped air and promote particle rearrangement to densify the mixture. In the case of extrusion, the extruder may be fixed or moving. A fixed extruder pushes the mixture through channels that shape the mixture to the desired shape and promotes particle rearrangement to densify the article. The article is pushed out of the die within the extruder where upon it may be cut to a desired length and the article stacked for curing. A moving extruder pushes the mixture against a fixed stop and through channels that shape the mixture to the desired shape. As the mixture is pushed against the fixed stop the pressure increases within the mixture, particles rearrange and the mixture is densified. As more and more material is extruded the compacted mixture pushes the extruder along an extrusion bed.

In certain preferred embodiments, the step of maintaining an atmosphere of $CO_2$ and water vapor in the one or more interior ducts or channels includes/involves containing the atmosphere within the ducts or channels and/or around the exterior or the article; circulating the contained atmosphere of $CO_2$ and/or water vapor; removing or adding water vapor to or from the contained atmosphere; and heating the contained atmosphere. To achieve rapid and/or uniform curing, the number, shape, size and configuration of the ducts and channels may be designed to increase the contact area of $CO_2$ and water vapor with the wall of extruded body. Generally, temperature and concentration gradients will develop within the contained atmosphere and within the article itself as the curing proceeds. These gradients are recognized and controlled to achieve uniform curing of the article. The gas flow of $CO_2$ and water vapor may be controlled, for example, such as to oscillate in opposite directions to reverse the gradients when passing through the interior ducts or channels and outside the exterior of the article so that the effect of the temperature and concentration gradients average out over the curing period.

In certain preferred embodiments, the step of maintaining an atmosphere of $CO_2$ and water vapor in the one or more channels within the plurality of the concrete objects or between the plurality of concrete objects and the envelope or between the of the plurality of concrete objects and a chamber component includes/involves containing the atmosphere within the channels and/or around the exterior of the concrete object; circulating the contained atmosphere of $CO_2$ and/or water vapor; removing or adding water vapor to or from the contained atmosphere; and heating the contained atmosphere.

To achieve rapid and/or uniform curing, the number, shape, size and configuration of the channels may be designed to increase the contact area of $CO_2$ and water vapor with the wall of extruded body. Generally, temperature and concentration gradients will develop within the contained atmosphere and within the article itself as the curing proceeds. These gradients are recognized and controlled to achieve uniform curing of the article. The gas flow of $CO_2$ and water vapor may be controlled, for example, the direction of the gas flow is reversed alternatingly from one direction to the other to reverse the gradients when passing through the channels and outside the exterior faces of the article so that the effect of the temperature and concentration gradients average out over the curing period.

In certain preferred embodiments, the step of curing the casted or extruded body includes/involves contacting the article with an atmosphere of $CO_2$ and/or water vapor for a period of time.

Curing temperature and time may be adjusted according to the desired end product, for example, at a temperature in the range from about 20° C. to about 150° C. (e.g., from about 20° C. to about 140° C., from about 20° C. to about 120° C., from about 20° C. to about 100° C., from about 20° C. to about 90° C., from about 20° C. to about 80° C., from about 20° C. to about 70° C., from about 20° C. to about 60° C., from about 30° C. to about 100° C., from about 30° C. to about 90° C., from about 30° C. to about 80° C., from about 30° C. to about 70° C., from about 30° C. to about 60° C.) for about 1 hour to about 80 hours (e.g., for about 1 hour to about 70 hours, for about 1 hour to about 60 hours, for about 6 hours to about 80 hours, for about 6 hours to about 70 hours, for about 6 hours to about 60 hours, for about 10 hours to about 80 hours, for about 10 hours to about 70 hours, for about 10 hours to about 60 hours, for about 15 hours to about 60 hours, for about 15 hours to about 50 hours, for about 20 hours) under an atmosphere of water and $CO_2$.

The relative humidity environment of the curing process may be adjusted to fit the desired outcome, for example, ranging from about 10% to about 98% (e.g., from about 20% to about 98%, from about 30% to about 98%, from about 50% to about 98%, from about 80% to about 98%, from about 90% to about 98%, from about 10% to about 90%, from about 10% to about 70%, from about 10% to about 50%, from about 10% to about 40%, from about 10% to about 30%, from about 10% to about 20%) and with a $CO_2$ pressure ranging from about ambient atmospheric pressure to about 100 psi above ambient atmospheric pressure (e.g., from about ambient atmospheric pressure to about 90 psi above ambient, from about ambient atmospheric pressure to about 80 psi above ambient, from about ambient atmospheric pressure to about 70 psi above ambient, from about ambient atmospheric pressure to about 60 psi above ambient, from about 20 above ambient to about 100 psi above ambient, from about 30 above ambient to about 100 psi above ambient), and having a $CO_2$ concentration ranging from about 10% to about 90% and above (e.g., from about 20% to about 90%, from about 30% to about 90%, from about 40% to about 90%, from about 10% to about 70%, from about 10% to about 50%) to produce a composite material exhibiting a uniform, homogeneous, and porous structure.

In exemplary productions as in some embodiments of the invention, the materials used are ground calcium silicate. In exemplary embodiments, the calcium silicate composition of the invention, ground calcium silicate particles used have a particle size having a cumulative 10% diameter greater than 1 μm in the volume distribution of the particle size distribution.

The ground calcium silicate may have a median particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a surface area from about 1.5 $m^2$/g to about 3.5 $m^2$/g (e.g., 1.5 $m^2$/g, 2.0 $m^2$/g, 2.3 $m^2$/g, 2.5 $m^2$/g, 2.8 $m^2$/g, 3.0 $m^2$/g, 3.2 $m^2$/g, 3.5 $m^2$/g).

In certain preferred embodiments, the particulate composition comprises about 10 wt. % to about 95 wt. % of ground calcium silicate materials (e.g., about 20 wt. % to about 95 wt. %, about 30 wt. % to about 95 wt. %, about 50 wt. % to about 95 wt. %, about 60 wt. % to about 95 wt. %, about 20 wt. % to about 90 wt. %, about 20 wt. % to about 80 wt. %, about 20 wt. % to about 70 wt. %, about 30 wt. % to about 80 wt. %, about 50 wt. % to about 80 wt. %).

Chemical admixtures may be included for the manufacture of the discrete objects; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

In certain embodiments, the pigment may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%).

Thus, various combinations of curing conditions may be devised to achieve the desired production process, including varied reaction temperatures, pressures and lengths of reaction. In a first exemplary embodiment, water in liquid form along with $CO_2$ gas is delivered to an article that has been pre-dried in a drying oven and the curing process is conducted at about 90° C. and about 20 psig (i.e., 20 psi above ambient pressure) for about 48 hours. In a second exemplary embodiment, water is present in the precursor material (e.g., as residual water from prior mixing step) and $CO_2$ gas is delivered to an article and the curing process is performed at about 60° C. and 0 psig (at ambient atmospheric pressure) for about 19 hours. In a third exemplary embodiment, water is delivered to an article in vapor form along with $CO_2$ and the curing process is performed at about 90° C. and 20 psig (20 psi above ambient atmospheric pressure) for about 19 hours.

It is noted that the properties, production time and scale of the article can be fine tuned based on the disclosures herein, for example, by adjusting curing techniques (e.g., $CO_2$ delivery, system pressure and temperature) as well as mixture proportions and constituents.

In addition to the materials used and the manufacturing process offering favorable environmental and economical benefits, the hollow-core articles of the invention provide a number of benefits in performance over the hollow-core products made from conventional concrete, for example, superior stable properties are achievable in much shorter times than is the case for precast concrete articles made using ordinary Portland cement.

Bonding Elements, Bonding Matrices and Composite Materials

Chemical Discussion

This invention provides apparatus and methods used to manufacture novel composite materials that are cured predominantly by a $CO_2$ consumption reaction. The materials exhibit useful properties and can be readily produced from widely available, low cost precursor materials by a process suitable for large-scale production with minimal environmental impact. The precursor materials include inexpensive and abundant calcium silicate rich compositions, fine particles and coarse particles. The calcium silicate compositions may be comprised of a ground product containing a variety of calcium silicate phases (including, for example, CS, C3S2, C2S and a calcium silicate based amorphous phase). The fine and coarse particles may be comprised of ground limestone or other calcium carbonate based materials, ground quartz or other $SiO_2$ based materials, sand and crushed rock. The fine and coarse particles may also be comprised of crushed minerals such as granite, mica and feldspar. Other process components include water and $CO_2$. Various additives can be used to modify and fine-tune the physical appearance and/or mechanical properties of the resulting composite material, such as additives selected from one or more of pigments (e.g., black iron oxide, cobalt oxide and chromium oxide), colored glass and/or colored quartz. Additives regarding water usage reduction and changes in rheology can also be used.

The composite materials can be produced, as disclosed herein, using the energy-efficient Hydrothermal Liquid Phase Sintering (HLPS) process to create bonding elements which hold together the various components of the composite material. The composite materials can be manufactured at low cost and with favorable environmental impact. For example in preferred embodiments of the invention, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271, 566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. Pat. Publ. No. 2014/0314990 (application Ser. No. 14/207,920), U.S. Pat. No. 9,221,027 (application Ser. No. 14/209,238), U.S. Pub. No. 2014/0363665 (application Ser. No. 14/295,601), U.S. Pub. No. 2014/0361471 (application Ser. No. 14/295, 402), U.S. Pub. No. 2016/0355439 (application Ser. No. 14/506,079), U.S. Pub. No. 2015/0225295 (application Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074, 692), U.S. Pub. No. 2017/0102373 (application Ser. No. 15/290,328), U.S. Pub. No. 2017/0121223 (application Ser. No. 15/335,520), U.S. Pub. No. 2017/0204010 (application Ser. No. 15/409,352), U.S. Pub. No. 2017/0253530 (application Ser. No. 15/449,736), U.S. Pub. No. 2017/0260096 (application Ser. No. 15/451,344), U.S. Pub. No. 2017/0320781 (application Ser. No. 15/587,705), U.S. application Ser. No. 15/609,908, filed May 31, 2017, U.S. application Ser. No. 15/716,392, filed Sep. 26, 2017, each of which is expressly incorporated herein by reference in its entirety for all purposes.

FIG. 1 through FIG. 8 are phase diagrams that show various phase interrelationships among some of the materials described.

In certain preferred embodiments, the plurality of bonding elements are prepared by chemical transformation from ground calcium silicate compositions by reacting them with $CO_2$ via a gas-assisted HLPS process.

In certain embodiments, the composite material is characterized by a compressive strength from about 90 MPa to about 175 MPa (e.g., about 90 MPa to about 150 MPa, about 90 MPa to about 140 MPa, about 90 MPa to about 130 MPa, about 90 MPa to about 120 MPa, about 90 MPa to about 110 MPa, about 100 MPa to about 175 MPa, about 120 MPa to about 175 MPa, about 130 MPa to about 175 MPa, about 140 MPa to about 175 MPa, about 150 MPa to about 175 MPa, about 160 MPa to about 175 MPa).

In certain embodiments, the composite material is characterized by a flexural strength from about 5 MPa to about 30 MPa (e.g., about 5 MPa to about 25 MPa, about 5 MPa to about 20 MPa, about 5 MPa to about 15 MPa, about 5 MPa to about 10 MPa, about 10 MPa to about 30 MPa, about 20 MPa to about 30 MPa, about 25 MPa to about 30 MPa).

In certain embodiments, the composite material is characterized by water absorption of less than about 10% (e.g., less than about 8%, 5%, 4%, 3%, 2%, or 1%).

The composite material may display one or more of desired textures, patterns and physical properties, in particular those that are characteristic of natural stone. In certain preferred embodiments, the composite material exhibits a visual pattern similar to natural stone. Other characteristics include colors (e.g., black, white, blue, pink, grey (pale to dark), green, red, yellow, brown, cyan (bluish-green) or purple) and textures.

Equipment and Processing Discussion $CO_2$ Control

In the embodiments described, industrial grade $CO_2$ at about 99% purity is used, which is provided by a variety of different industrial gas companies, such as Praxair, Inc., Linde AG, Air Liquide, and others. This supply can be held in large pressurized holding tanks in the form of liquid carbon dioxide regulated at a temperature such that it maintains a vapor pressure of approximately 300 PSIG. This gas is then piped to a $CO_2$ curing enclosure or chamber. In the simplest system, $CO_2$ is flowed through the enclosure at a rate sufficient to displace the ambient air in the enclosure. In general, the purge time will depend on the size of the enclosure and the rate that $CO_2$ gas is provided. In many systems, this process of purging the enclosure of air can be performed in times measured in minutes to get the $CO_2$ concentration up to a reasonable level so that curing can be performed thereafter. In simple systems, $CO_2$ gas is then fed into the system at a predefined rate so to maintain a concentration of $CO_2$ sufficient to drive the curing reaction.

As an example, we now describe a method for sustaining carbon dioxide concentrations during the reaction that is well suited for keeping a highly consistent concentration, although it is a "closed loop" process which tends to be the most expensive technique. This method uses the measurement of $CO_2$ concentration in the system directly, and employs a controller such as a PLC to control the $CO_2$ concentration at a set point with an electronic/automated control valve. A measurement technique to measure $CO_2$ directly such as NDIR should preferably be employed. In the NDIR measurement method, a gas sample stream is pulled from the system via a low flow pump. A chiller is used to drop moisture out of the gas stream before it is sampled by the NDIR instrument. Therefore the measurement provided by the analyzer is missing the water vapor component of the gas stream and needs be adjusted to account for the humidity that has been removed from the test sample. A measurement of the humidity in the system gas flow can be performed using a dry bulb-wet bulb psychrometric technique, using a dry bulb-wet bulb humidity measurement device or using a different type of moisture sensor. The true $CO_2$ concentration can be calculated using the computer control system or PLC. Once the true $CO_2$ concentration is known, the actuated proportioning control valve can add dry $CO_2$ into the system when it has been consumed and has gone below the set point that is desired at that time. In various embodiments, the set point can vary with time, if necessary, based on experience in curing specific compositions, shape and sizes of composite material specimens.

Humidity Control

Figure 9:
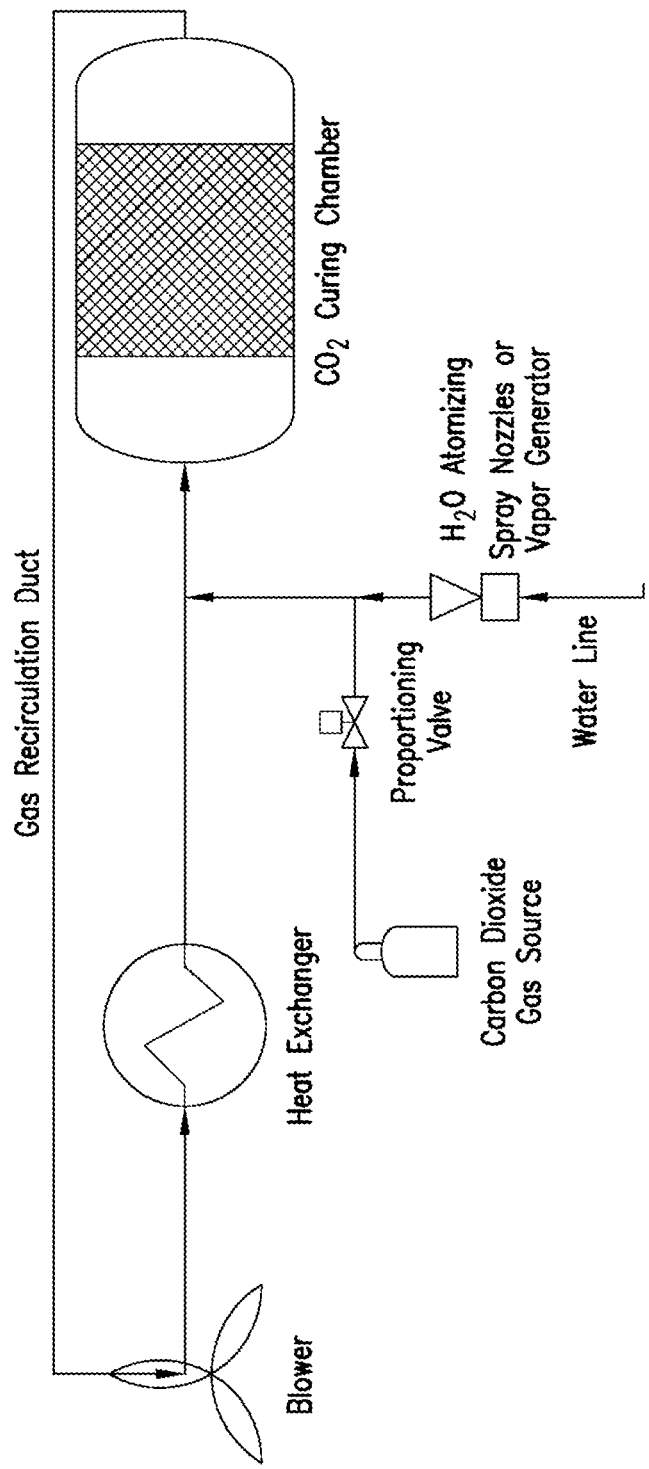
FIG. 9 is a schematic diagram of a $CO_2$ composite material curing chamber that provides humidification according to principles of the invention.

FIG. 9 is a schematic diagram of a $CO_2$ composite material curing chamber that provides humidification according to principles of the invention. In FIG. 9, a water supply is provided and water vapor is added to the atmosphere that is circulating within the curing chamber. The water can be any convenient source of potable water. In some embodiments, ordinary tap water is used. In some embodiments, the water can be converted to vapor by flowing through a misting nozzle or an atomizing spray nozzle, an electric vapor generator, a gas fired vapor generator, or by being heated above the gas temperature in the chamber so as to cause evaporation from a liquid water supply an example being a drum reactor with an immersion heater. In yet another embodiment, the $CO_2$ supply can be flowed into the systems after having been bubbled through a heated water supply in order to increase relative humidity of the incoming gas stream an example being a drum reactor configured for "flow through" or "open loop" processing.

Relative humidity is an important parameter in both traditional concrete curing as well as in $CO_2$ composite material curing. In a traditional curing chamber a moist air atmosphere exists that is comprised of mostly nitrogen, oxygen, and water vapor. In these systems relative humidity is most often measured by a standard capacitive sensor technology. However, $CO_2$ curing chambers have a gas atmosphere comprised predominately of carbon dioxide that is incompatible with some types of these sensors. Sensing technology such as dry-bulb wet-bulb techniques that utilize the psychrometric ratios for carbon dioxide and water vapor or dipole polarization water vapor measurement instruments or chilled mirror hygrometers or capacitive humidity sensors can be used in the $CO_2$ composite material curing systems described herein.

Depending on the type and geometry of the product being cured, the design of the chamber, and the packing efficiency of product in the chamber the humidity may need to be either decreased or increased and regulated to a specified set point. Set points may range anywhere from 1% to 99% relative humidity. Three different methods for humidity control may exist in $CO_2$ composite material curing processes that could be combined into a single system. One method for humidification in one embodiment of a $CO_2$ curing system is represented in FIG. 9. Another method allows one to remove moisture from the system to cure the composite material products with $CO_2$. A simple method of reducing the relative humidity is by displacing the humid gas in the system with a dry gas, such as carbon dioxide. In still another embodiment, one can reduce relative humidity and therefore remove water vapor from the gas by a non-purging method, which in one preferred embodiment is a chilled heat exchanger that performs water extraction.

Figure 10:
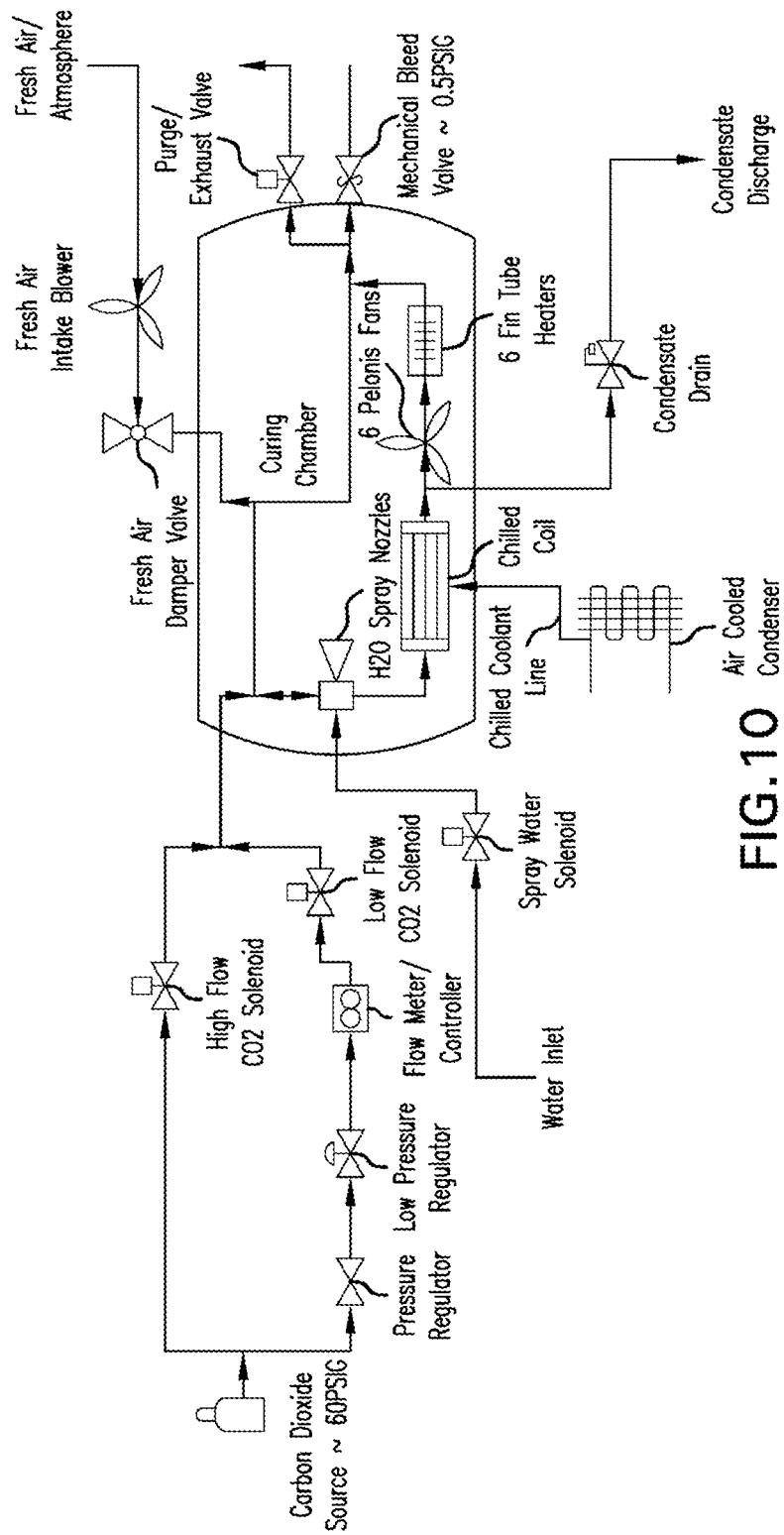
FIG. 10 is a schematic diagram of a curing chamber with multiple methods of humidity control as well as ability to control and replenish $CO_2$ using constant flow or pressure regulation and that can control the temperature according to principles of the invention.

FIG. 10 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value. If deviation from the desired value is measured, corrective action is taken to bring the value of the parameter into agreement with the desired value. Such control systems can be expensive and complex, and may be useful with regard to high value products or products that require very precise process conditions.

Temperature Control

In some embodiments, temperature is measured utilizing a sensor such as a thermocouple or an RTD. The measurement signal is directed back to a controller or computer that is able to regulate energy into the heat exchanger and thereby adjust the temperature of the entire system over time. The blower is an important component of the heating system as it is able to help transfer the heat energy to the gas which transfers to the products and the chamber itself which is an important part of controlled moisture of the samples. The method of heating can be electric or gas fired. Jacket heaters may be utilized to control the temperature of the $CO_2$ that flows through a chamber in contact with the heating jacket, any convenient source of heat can be used. The means of external heating may include but are not limited to electric heating, hot water heating, or hot oil heating. For $CO_2$ curing chambers indirect gas fired systems have been utilized thus far and direct fired gas burners have been avoided because they will pull air and products of combustion into the system, thereby diluting the $CO_2$ and making control of the $CO_2$ concentration problematic. Some smaller scale systems such as the Drum Reactors utilize electric jacket heaters to heat the entire surface of the chamber rather than a heating element within the chamber.

Gas Flow Control

Another control parameter is gas velocity across the material that is to be cured in the system. The gas velocity can be very dependent on process equipment variables including but not limited to chamber design, baffle design, fan size, fan speed/power, number of fans, temperature gradient within the system, rack design within the system, and sample geometry within the system. The simplest method to control the gas velocity within the chamber is by adjusting the blower speed (RPM's), typically done by utilization of a variable frequency drive to allow for control of the blower motor speed. The blower can be used to circulate gas at a desired velocity in the curing chamber. Gas velocity in the system is measured in the system via a variety of different techniques including but not limited to pitot tubes measurement and laser Doppler detection systems. The measurement signal for gas velocity can be sent back to a computer system or programmable logic controller and be utilized as a control parameter in the curing profile.

Process of Preparing a Composite Material

A general process for preparing a composite material includes: mixing a particulate composition and a liquid composition to create a slurry mixture; forming the slurry mixture into a desired shape, either by casting the slurry into a mold, pressing the slurry in a mold, pressing the slurry in a vibrating mold, extruding the slurry, slip forming the slurry, or using any other shape-forming method common in concrete production, and curing the formed slurry mixture at a temperature in the range from about 20° C. to about 150°

C. for about 1 hour to about 80 hours under a vapor comprising water and $CO_2$ and having a pressure in the range from about ambient atmospheric pressure to about 50 psi above ambient atmospheric pressure and having a $CO_2$ concentration ranging from about 10% to about 90% to produce a composite material exhibiting a texture and/or a pattern and the desired physical properties related to compressive strength, flexural strength, density, resistance to degradation, and so forth.

The particulate composition includes a ground calcium silicate composition having a mean particle size in the range from about 1 μm to about 100 μm. In addition the particulate composition may include a ground calcium carbonate or a $SiO_2$ bearing material having a mean particle size in the range from about 3 μm to about 25 mm. The liquid composition includes water and may include a water-soluble dispersant.

The process can further include, before curing the casted mixture, the step of drying the casted mixture. The particulate composition further comprises a pigment or a colorant as discussed herein.

In certain embodiments, curing the formed slurry mixture is performed at a temperature in the range from about 30° C. to about 120° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 60° C. to about 110° C. for about 1 hour to about 70 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature in the range from about 80° C. to about 100° C. for about 1 hour to about 60 hours under a vapor comprising water and $CO_2$ and having a pressure in the range from about ambient atmospheric pressure to about 30 psi above ambient atmospheric pressure.

In certain embodiments, curing the formed slurry mixture is performed at a temperature equal to or lower than about 60° C. for about 1 hour to about 50 hours under a vapor comprising water and $CO_2$ and having an ambient atmospheric pressure.

For example, in some embodiments, the ground calcium silicate composition has a mean particle size from about 1 μm to about 100 μm (e.g., about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 $m^2$/kg to about 700 $m^2$/kg (e.g., 150 $m^2$/kg, 200 $m^2$/kg, 250 $m^2$/kg, 300 $m^2$/kg, 350 $m^2$/kg, 400 $m^2$/kg, 450 $m^2$/kg, 500 $m^2$/kg, 550 $m^2$/kg, 600 $m^2$/kg, 650 m2/kg, 700 m2/kg).

In certain preferred embodiments, the liquid composition includes water and a water-soluble dispersant comprising a polymer salt (e.g., an acrylic homopolymer salt) having a concentration from about 0.1% to about 2% w/w of the liquid composition.

Composite materials prepared according to a process disclosed herein can exhibit a compressive strength from about 3.0 MPa to about 30.0 MPa (e.g., about 3 MPa, 5 MPa, 10 MPa, 15 MPa, 20 MPa, 25 MPa, 30 MPa) and a flexural strength from about 0.3 MPa to about 4.0 MPa (e.g., about 0.3 MPa, 0.5 MPa, 1.0 MPa, 1.5 MPa, 2.0 MPa, 2.5 MPa, 3.0 MPa, 3.5 MPa, 4.0 MPa).

Figure 13A:
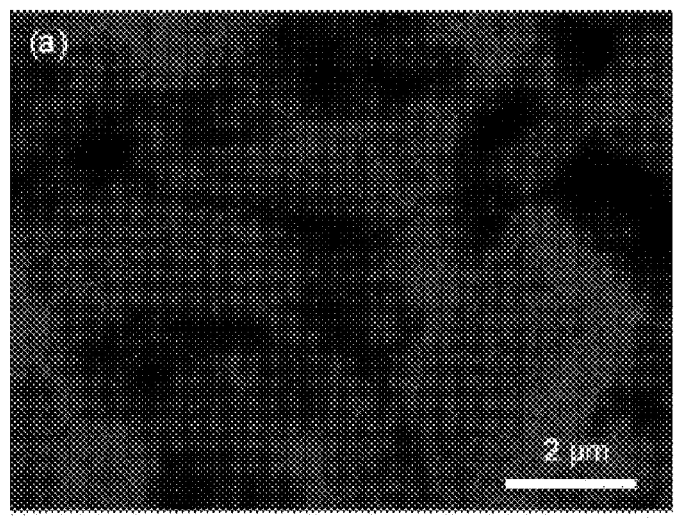
FIGS. 13$a$-FIG. 13$c$ show exemplary images of an example of bonding elements showing energy-dispersive X-ray spectroscopy (EDS) chemical mapping of a bonding matrix according to an exemplary embodiment of the present invention, illustrating superposition of Si (a) and Ca (b) map. In (c) the regions of $CaSiO$, $SiO_2$, and $CaCO_3$ are referenced by arrows. Fiber shaped wollastonite ($CaSiO_3$) core particles are encapsulated by $SiO_2$ rich regions and surrounded by $CaCO_3$ particles.
Figure 13B:
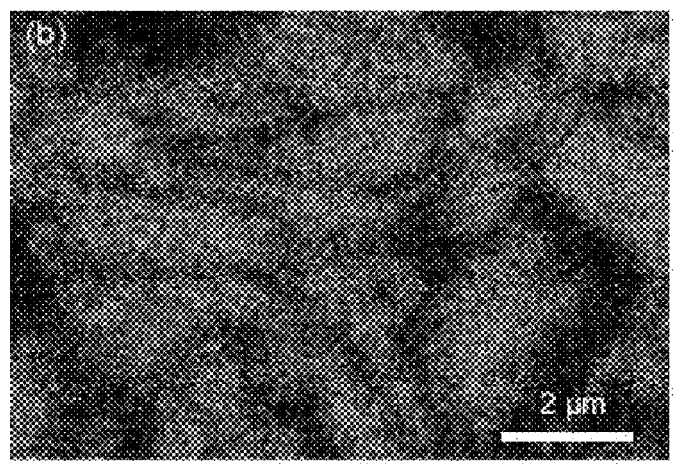
Figure 13C:
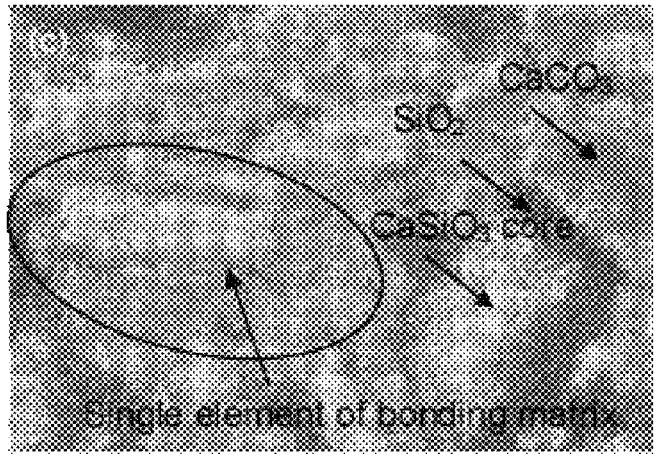
Figure 14:
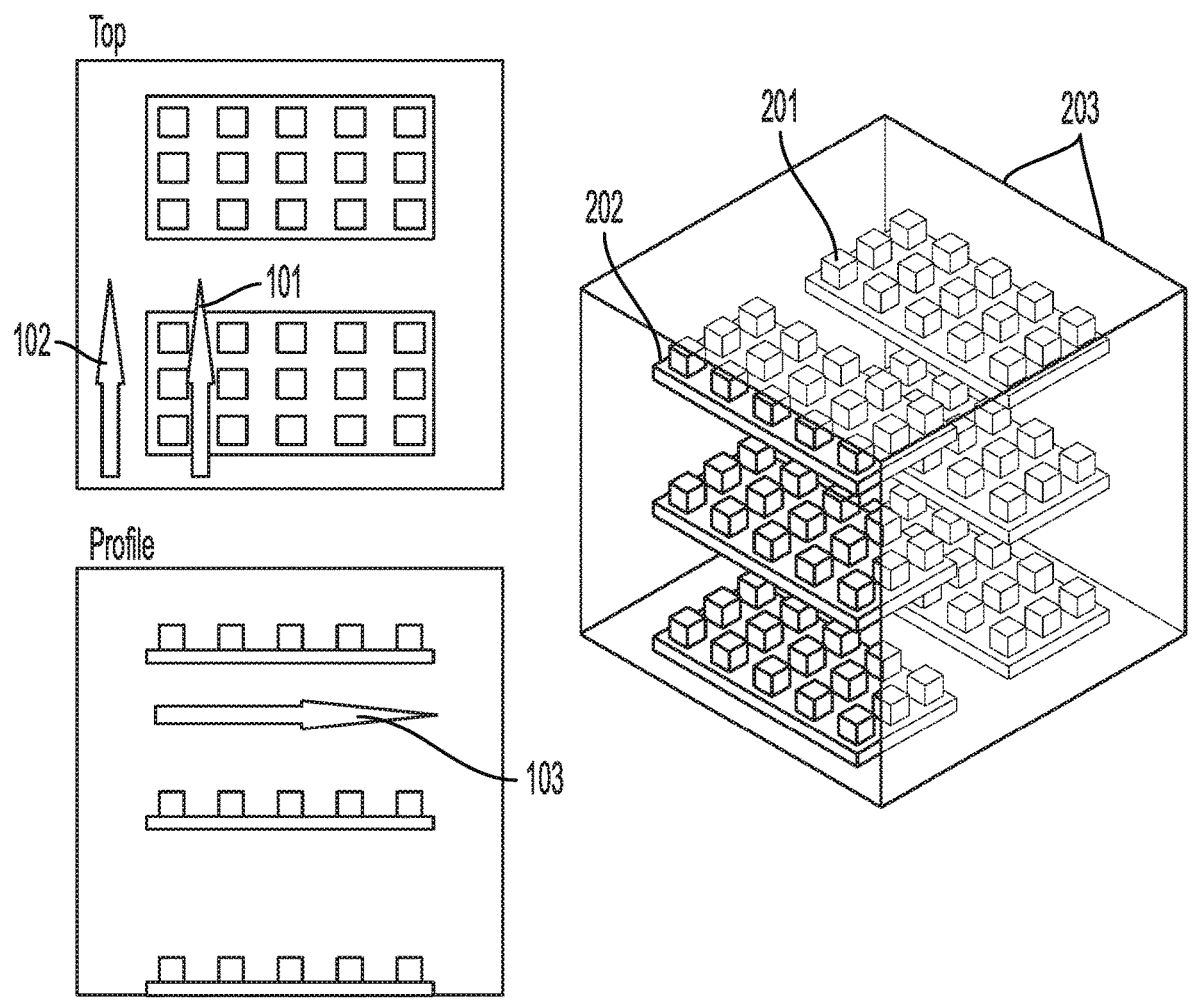
FIG. 14 shows an exemplary embodiment where a plurality of discrete objects (201) are dry cast onto a board (202) and arranged within an envelope or a chamber (203). The fluid flow is directed between the one or more ducts or channels (101), and between the exterior of the plurality of discrete objects and the envelope or chamber (102), and the exterior of the plurality of the discrete concrete objects and a chamber component (103). The chamber component is a board in this example. Other embodiments of chamber components such as baffle plates, flow regulating and directing plates, rack components and similar structures.

Any suitable precursor materials may be employed including, for example, calcium silicate composition disclosed herein. It is believed that calcium cations are leached from the calcium silicate composition particles and transform the peripheral portion of the calcium silicate composition particle into calcium-deficient state. As the calcium cations continue to be leached from the peripheral portion of the particle, the structure of the peripheral portion eventually become unstable and breaks down, thereby transforming the calcium-deficient peripheral portion of the particle into a predominantly silica-rich first layer. Meanwhile, a predominantly calcium carbonate second layer precipitates from the water. An example of this three-layer structure is shown in FIGS. 13a-FIG. 13c, reproduced from U.S. Pub. No. 2013/0122267 A1 (FIG. 6(a)-6(c)), showing examples of energy-dispersive X-ray spectroscopy (EDS) chemical mapping of an exemplary bonding matrix and illustrating superposition of Si (FIG. 13a) and Ca (FIG. 13b) map. In FIG. 13c the regions of CaSiO, $SiO_2$, and $CaCO_3$ are referenced by arrows. The wollastonite ($CaSiO_3$) core particles are encapsulated by $SiO_2$ rich regions and surrounded by $CaCO_3$ particles. Different elements of bonding matrix are held together by $CaCO_3$ particles. XRD of this composition revealed that $CaSiO_3$ and $CaCO_3$ (calcite) are crystalline phases, whereas silica rich regions are amorphous.

As used herein, the term "coarse" and "fine" filler particles refers to any suitable material, having a suitable particle size and size distribution. In certain preferred embodiments, for example, the filler particles are made from a calcium carbonate-rich material such as limestone (e.g., ground limestone). In certain materials, the filler particles are made from one or more of $SiO_2$-based or silicate-based material such as quartz, mica, granite, and feldspar (e.g., ground quartz, ground mica, ground granite, ground feldspar).

In certain embodiments, filler particles may include natural, synthetic and recycled materials such as glass, recycled glass, coal slag, fly ash, calcium carbonate-rich material and magnesium carbonate-rich material.

In certain embodiments, the plurality of "coarse" and "fine" filler particles have a mean particle size in the range from about 5 μm to about 7 mm (e.g., about 5 μm to about 5 mm, about 5 μm to about 4 mm, about 5 μm to about 3 mm, about 5 μm to about 2 mm, about 5 μm to about 1 mm, about 5 μm to about 500 μm, about 5 μm to about 300 μm, about 20 μm to about 5 mm, about 20 μm to about 4 mm, about 20 μm to about 3 mm, about 20 μm to about 2 mm, about 20 μm to about 1 mm, about 20 μm to about 500 μm, about 20 μm to about 300 μm, about 100 μm to about 5 mm, about 100 μm to about 4 mm, about 100 μm to about 3 mm, about 100 μm to about 2 mm, about 100 μm to about 1 mm).

In some embodiments, the weight ratio of bonding elements to the "coarse" and "fine" filler particles may be any suitable ratio dependent on the intended application for the composite material product. For example, the weight ratio of bonding elements to the "coarse" or "fine" filler particles may be in the range from about (50 to 99): about (1 to 50), e.g., from about (60 to 99): about (1 to 40), from about (80 to 99): about (1 to 20), from about (90 to 99): about (1 to 10), from about (50 to 90): about (10 to 50), from about (50 to 70): about (30 to 50). In certain embodiments depending on the application, the weight ratio of bonding elements to filler particles may be in the range from about (10 to 50): about (50 to 90), e.g., from about (30 to 50): about (50 to 70), from about (40 to 50): about (50 to 60).

More specifically, the first layer and second layer may be formed from the precursor particle according the following reactions (1-3) which can use water as a reaction medium, and not as a reagent (that is, the water is not consumed):

$$CaSiO_3 \text{ (s)} + CO_2 \text{ (g)} \rightarrow CaCO_3 \text{ (s)} + SiO_2 \text{ (s)} \quad (1)$$

$$Ca_3Si_2O_7 \text{ (s)} + 3CO_2 \text{ (g)} \rightarrow 3CaCO_3 \text{ (s)} + 2SiO_2 \text{ (s)} \quad (2)$$

$$Ca_2SiO_4 \text{ (s)} + 2CO_2 \text{ (g)} \rightarrow 2CaCO_3 \text{ (s)} + SiO_2 \text{ (s)} \quad (3)$$

For example, in a silicate mineral carbonation reaction such as with calcium silicate compositions, $CO_2$ is introduced as a gas phase that dissolves into an infiltration fluid, such as water. The dissolution of $CO_2$ forms acidic carbonic species (such as carbonic acid, $H_2CO_3$) that results in a decrease of pH in solution. The weakly acidic solution incongruently dissolves calcium species from the calcium silicate phases. Calcium may be leached from calcium containing amorphous phases through a similar mechanism. The released calcium cations and the dissociated carbonate species lead to the precipitation of insoluble carbonates. Silica-rich layers are thought to remain on the mineral particles as calcium depleted layers.

Thus, according to a preferred embodiment of the invention, $CO_2$ preferentially reacts with the calcium cations of the calcium silicate composition precursor core, thereby transforming the peripheral portion of the precursor core into a silica-rich first layer and a calcium carbonate-rich second layer. Also, the presence of the first and second layers on the core act as a barrier to further reaction between calcium silicate and carbon dioxide, resulting in the bonding element having the core, first layer and second layer.

In some embodiments, silicate materials having metals other than Ca or in addition to Ca, for example fosterite ($Mg_2SiO_4$), diopside ($CaMgSi_2O_6$), and talc ($Mg_3Si_4O_{10}(OH)_2$) can react with carbon dioxide dissolved in water in a manner similar to the reaction of calcium silicate, as described above. It is believed that such silicate materials can be used, alone, in combination, and/or in combination with calcium silicate, as precursors for bonding elements according to principles of the invention.

Preferably, gas-assisted HLPS processes utilize partially infiltrated pore space so as to enable gaseous diffusion to rapidly infiltrate the porous preform and saturate thin liquid interfacial solvent films in the pores with dissolved $CO_2$. $CO_2$-based species have low solubility in pure water (1.5 g/L at 25° C., 1 atm.). Thus, a substantial quantity of $CO_2$ must be continuously supplied to and distributed throughout the porous preform to enable significant carbonate conversion. Utilizing gas phase diffusion offers a huge (about 100-fold) increase in diffusion length over that of diffusing soluble $CO_2$ an equivalent time in a liquid phase. ("Handbook of chemistry and physics", Editor: D. R. Lide, Chapters 6 and 8, $87^{th}$ Edition 2006-2007, CRC.) This partially infiltrated state enables the reaction to proceed to a high degree of carbonation in a fixed period of time.

Liquid water in the pores speeds up the reaction rate because it provides a medium for ionization of both carbonic acid and calcium species. However, water levels need to be low enough such that $CO_2$ gas can diffuse into the porous matrix prior to dissolution in the pore-bound water phase. Furthermore, the actively dissolving porous preform serves as a template for expansive reactive crystal growth. Thus, the bonding element and matrices can be formed with minimal distortion and residual stresses. This enables large and complex shapes to result, such as those needed for infrastructure and building materials, in addition to many other applications.

Thus, various combinations of curing conditions may be devised to achieve the desired production process, including varied reaction temperatures, pressures and lengths of reaction. In a first exemplary embodiment, water is present in the precursor material (e.g., as residual water from prior mixing step) and liquid water is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a second exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is conducted at about 90° C. and about 20 psig (i.e., 20 psi above ambient pressure) for times ranging from about 2 to 90 hours.

In a third exemplary embodiment, water is present in the precursor material (e.g., as residual water from prior mixing step) and water vapor is provided to precursor materials (e.g., to maintain water level and/or control the loss of water from evaporating) along with $CO_2$ and the curing process is performed at about 25 to 90° C. and 0 psig (at ambient atmospheric pressure) for about 2 to 72 hours.

In the above embodiments, the time required for curing of a composite material object is determined by the ability of water vapor and $CO_2$ gas to diffuse throughout the object. In general, thicker objects take longer to cure than thinner objects. Similarly, objects with high density (and fewer open pore spaces) take longer to cure than objects with low density (and more open pore spaces). The following table provides examples of how the curing times may vary with respect to the smallest thickness (or wall thickness or section thickness) of the three dimensions and the bulk density of an object that is being manufactured.

TABLE 1

Examples of Curing Times and Smallest Thickness

| Composite Material Smallest Thickness (mm) | Composite Material Bulk Density (g/cm³) | Approximate Curing Time (h) |
|---|---|---|
| 25 | 1.6-2.3 | 8-12 |
| 75 | 2.1-2.3 | 16 |
| 100 | 0.4-0.8 | 8-12 |
| 200 | 1.5 | 72 |
| 200 | 2.4 | 72 |

Discussion of Manufactured Microstructures

Figure 11:
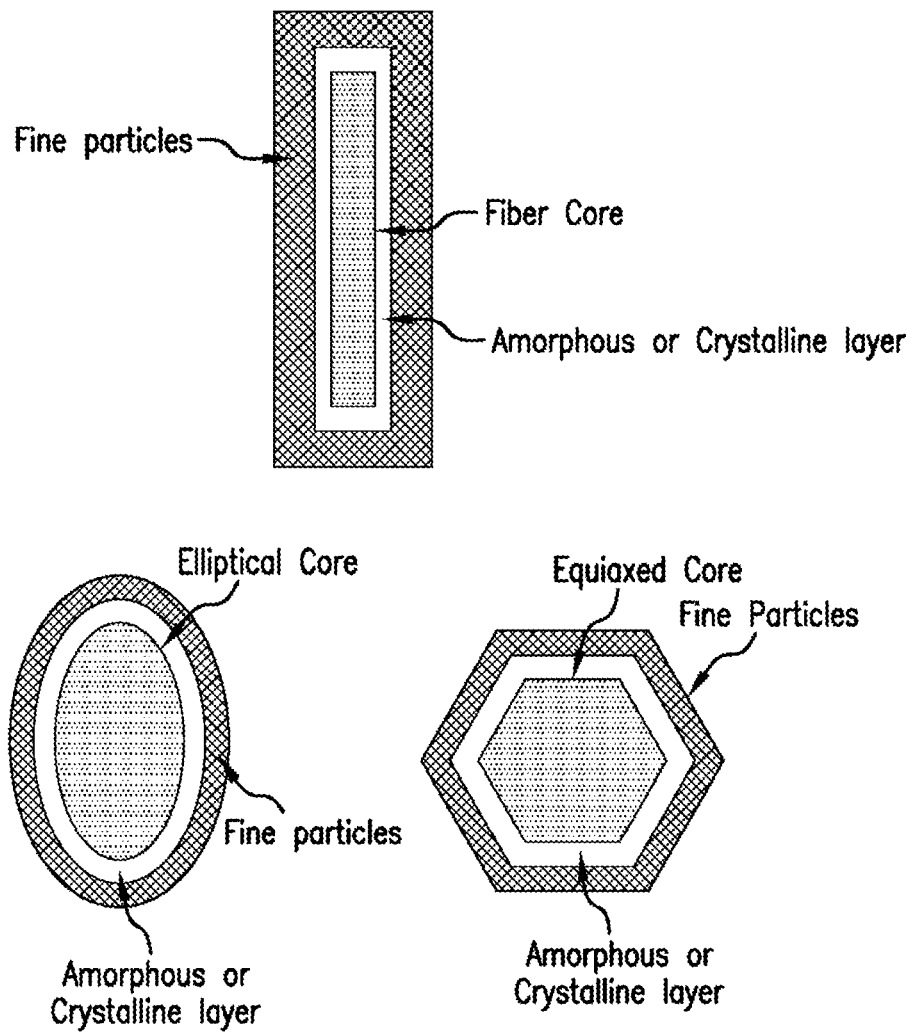
FIG. 11 is schematic illustrations of cross-sections of bonding elements according to exemplary embodiments of the present invention, including three exemplary core morphologies: fibrous, elliptical, and equiaxed.

As schematically illustrated in FIGS. 11(*a*)-11(*c*), a bonding element includes a core (represented by the black inner portion), a first layer (represented by the white middle portion) and a second or encapsulating layer (represented by the outer portion). The first layer may include only one layer or multiple sub-layers and may completely or partially cover the core. The first layer may exist in a crystalline phase, an amorphous phase or a mixture thereof, and may be in a continuous phase or as discrete particles. The second layer may include only one layer or multiple sub-layers and may also completely or partially cover the first layer. The second layer may include a plurality of particles or may be of a continuous phase, with minimal discrete particles.

A bonding element may exhibit any size and any regular or irregular, solid or hollow morphology depending on the intended application. Exemplary morphologies include: cubes, cuboids, prisms, discs, pyramids, polyhedrons or multifaceted particles, cylinders, spheres, cones, rings, tubes, crescents, needles, fibers, filaments, flakes, spheres, sub-spheres, beads, grapes, granulars, oblongs, rods, ripples, etc.

In general, as discussed in greater detail herein, a bonding element is produced from reactive precursor materials (e.g., precursor particles) through a transformation process. The precursor particles may have any size and shape as long as they meet the needs of the intended application. The transformation process generally leads to the corresponding bonding elements having similar sizes and shapes of the precursor particles.

Figure 12A:
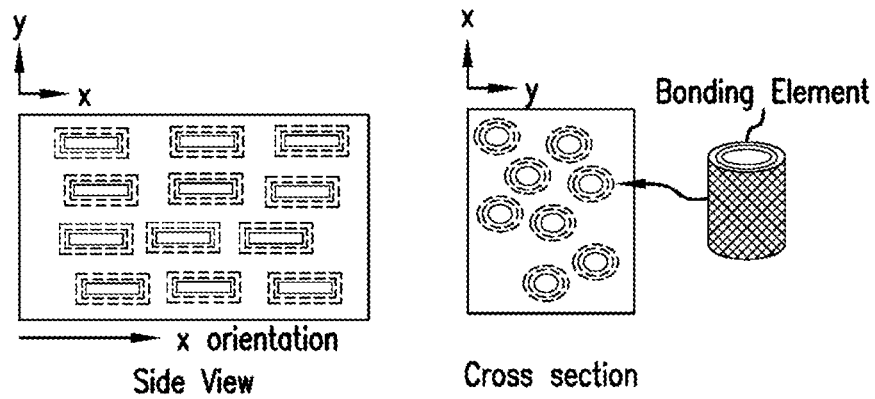
FIGS. 12($a$)-12($f$) are schematic illustrations of side view and cross section views of composite materials according to exemplary embodiments of the present invention, illustrating FIG. 12($a$) 1D oriented fiber-shaped bonding elements in a dilute bonding matrix (bonding elements are not touching), FIG.12($b$) 2D oriented platelet shaped bonding elements in a dilute bonding matrix (bonding elements are not touching), FIG. 12($c$) 3D oriented platelet shaped bonding elements in a dilute bonding matrix (bonding elements are not touching), and FIG. 12($d$) randomly oriented platelet shaped bonding elements in a dilute bonding matrix (bonding elements are not touching), wherein the composite materials includes the bonding matrix and filler components such as polymers, metals, inorganic particles, aggregates etc., FIG. 12($e$) a concentrated bonding matrix (with a volume fraction sufficient to establish a percolation network) of bonding elements where the matrix is 3D oriented, and FIG. 12($f$) a concentrated bonding matrix (with a volume fraction sufficient to establish a percolation network) of randomly oriented bonding elements, wherein filler components such as polymers, metals, inorganic particles, aggregates etc. may be included.
Figure 12B:
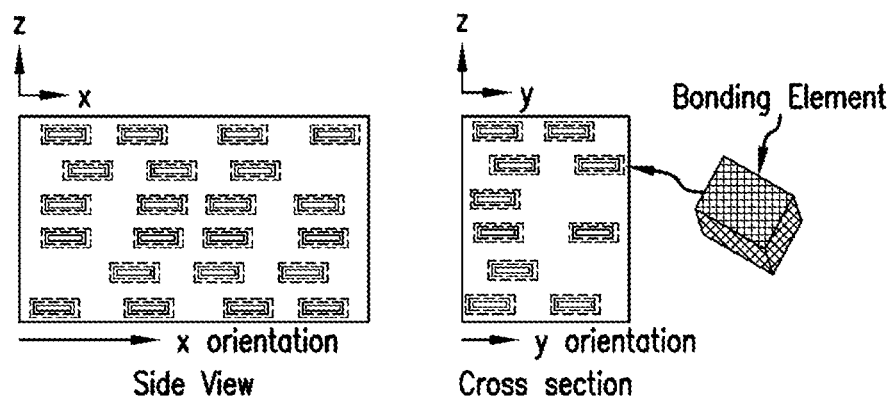
Figure 12C:
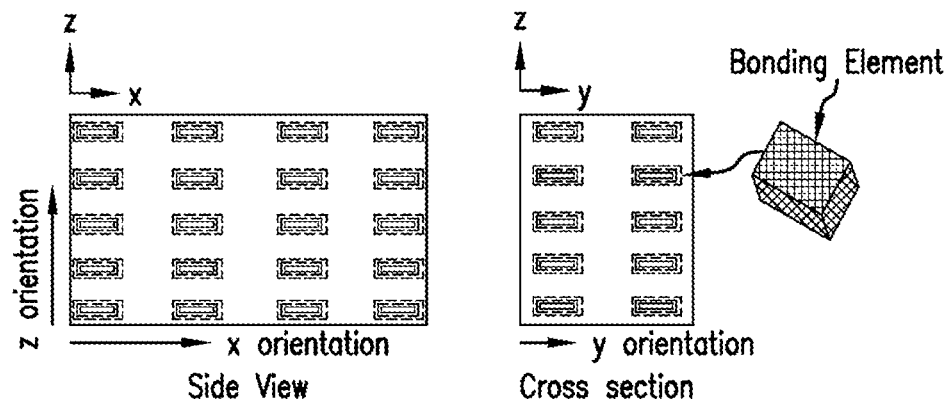
Figure 12D:
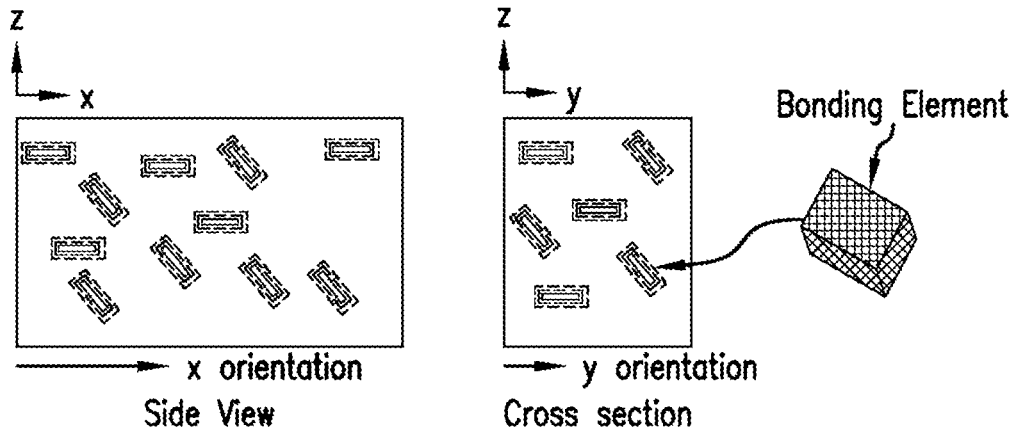
Figure 12E:
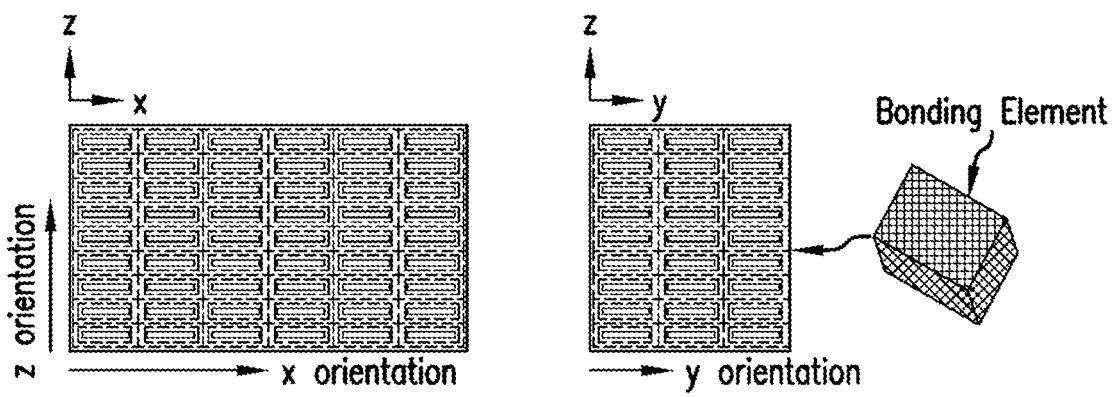
Figure 12F:
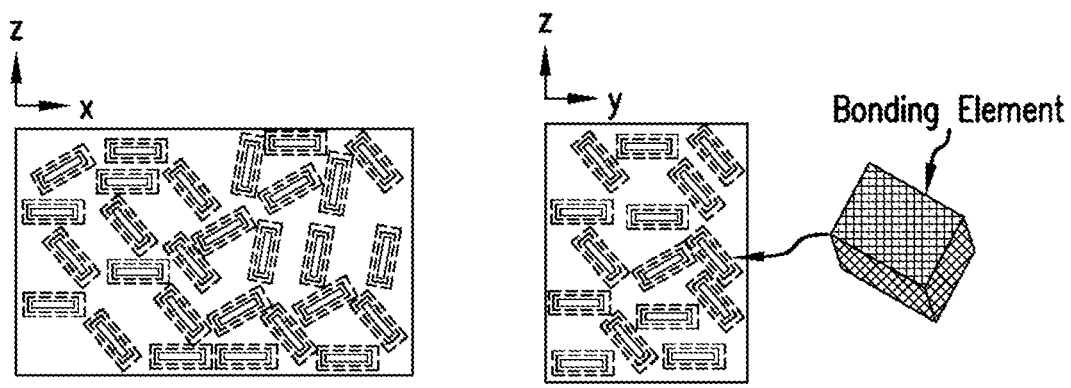

Within the bonding matrix, the bonding elements may be positioned, relative to each other, in any one of a number of orientations. FIGS. 12(a)-12(f) schematically illustrate an exemplary bonding matrix that includes fiber- or platelet-shaped bonding elements in different orientations possibly diluted by the incorporation of filler material, as represented by the spacing between the bonding elements. FIG. 12(a), for example, illustrates a bonding matrix that includes fiber-shaped bonding elements aligned in a one-direction ("1-D") orientation (e.g., aligned with respect to the x direction). FIG. 12(b) illustrates a bonding matrix that includes platelet-shaped bonding elements aligned in a two-direction ("2-D") orientation (e.g., aligned with respect to the x and y directions). FIG. 12(c) illustrates a bonding matrix that includes platelet-shaped bonding elements aligned in a three-direction ("3-D") orientation (e.g., aligned with respect to the x, y and z directions). FIG. 12(d) illustrates a bonding matrix that includes platelet-shaped bonding elements in a random orientation, wherein the bonding elements are not aligned with respect to any particular direction. FIG. 12(e) illustrates a bonding matrix that includes a relatively high concentration of platelet-shaped bonding elements that are aligned in a 3-D orientation. FIG. 12(f) illustrates a bonding matrix that includes a relatively low concentration of platelet-shaped bonding elements that are situated in a random orientation (a percolation network). The composite material of FIG. 12(f) achieves the percolation threshold because a large proportion of the bonding elements are touching one another such that a continuous network of contacts are formed from one end of the material to the other end. The percolation threshold is the critical concentration above which bonding elements show long-range connectivity with either an ordered, e.g., FIG. 12(e), or random orientation, e.g., FIG. 12(f), of bonding elements. Examples of connectivity patterns can be found in, for example, Newnham, et al., "Connectivity and piezoelectric-pyroelectric composites", *Mat. Res. Bull. Vol.* 13, pp. 525-536, 1978).

The plurality of bonding elements may be chemically transformed from any suitable precursor materials, for example, from any suitable calcium silicate composition precursor. The precursor calcium silicate composition may also include one or more chemical elements of aluminum, magnesium and iron.

The plurality of bonding elements may have any suitable mean particle size and size distribution dependent on the desired composite material. In certain embodiments, the plurality of bonding elements have a mean particle size in the range of about 1 µm to about 100 µm (e.g., about 1 µm to about 80 µm, about 1 µm to about 60 µm, about 1 µm to about 50 µm, about 1 µm to about 40 µm, about 1 µm to about 30 µm, about 1 µm to about 20 µm, about 1 µm to about 10 µm, about 5 µm to about 90 µm, about 5 µm to about 80 µm, about 5 µm to about 70 µm, about 5 µm to about 60 µm, about 5 µm to about 50 µm, about 5 µm to about 40 µm, about 10 µm to about 80 µm, about 10 µm to about 70 µm, about 10 µm to about 60 µm, about 10 µm to about 50 µm, about 10 µm to about 40 µm, about 10 µm to about 30 µm, about 10 µm to about 20 µm).

In some instances a composite material includes: a plurality of bonding elements and a plurality of filler particles. Each bonding element includes: a core comprising primarily calcium silicate composition, a silica-rich first or inner layer, and a calcium carbonate-rich second or outer layer. The plurality of bonding elements and the plurality of filler particles together form one or more bonding matrices and the bonding elements and the filler particles are substantially evenly dispersed therein and bonded together, whereby the composite material exhibits one or more textures, patterns and physical properties. In some instances, the bonding elements may have a core of magnesium silicate, and a silica-rich first or inner layer, and a magnesium carbonate-rich second or outer layer. The magnesium silicate can include aluminum, calcium, iron or manganese oxides.

In certain embodiments, these composite materials may display various patterns, textures and other characteristics, such as visual patterns of various colors. In addition, the composite materials of the invention exhibit compressive strength, flexural strength and water absorption properties similar to conventional concrete or the corresponding natural materials.

In certain embodiments, the composite further includes a pigment. The pigment may be evenly dispersed or substantially unevenly dispersed in the bonding matrices, depending on the desired composite material. The pigment may be any suitable pigment including, for example, oxides of various metals (e.g., iron oxide, cobalt oxide, chromium oxide) The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight (e.g., about 0.0% to about 8%, about 0.0% to about 6%, about 0.0% to about 5%, about 0.0% to about 4%, about 0.0% to about 3%, about 0.0% to about 2%, about 0.0% to about 1%, about 0.0% to about 0.5%, about 0.0% to about 0.3%, about 0.0% to about 2%, about 0.0% to about 0.1%,).

EXAMPLES

Example 1

Curing System with Adjustable Spacing between Chamber Components

A curing system was fabricated wherein the spacing between product boards can be adjusted. Increasing or decreasing the spacing between the boards on which the discrete concrete objects were placed changes the size of the channel 101 formed between the top of the discrete concrete objects and the bottom of the board above the discrete concrete object. The size of this channel 101, governed by the gap between the boards and the dimensions of the discrete concrete objects, impact the velocity of the fluid traveling across the objects. For a constant volume of fluid flow between the boards, a smaller channel 101 increases the velocity and widening the channel 101 decreases the velocity.

Figure 15:
FIG. 15 shows an exemplary photograph of a curing system with adjustable racking. The channel height between the top of the concrete objects and the bottom of the next product board (101) can be adjusted to change the velocity of the process gas (102).

Depending on the bonding element to filler ratio, water content, degree of compaction and dimensions of the uncured discrete concrete objects, a change in the velocity of fluid flow through the increased or decreased size of the channel 101 is desirable. An image of this system is shown in FIG. 15.

In some embodiments, where the bonding element to filler ratio is high, it may be desirable to increase the size of channel 101 to improve the properties of the finished objects and optimize the total process time requirement.

In some embodiments, where the bonding element to filler ratio is low, it may be desirable to decrease the size of channel 101 to improve the properties of the finished objects optimize the total process time requirement.

In some embodiments multiple categories of discrete concrete objects with differing bonding element to filler ratio, water content, degree of compaction or dimensions will be processed in the same chamber or envelope. In this embodiment, the size of channel 101 can be adjusted independently for each product board according to the concrete object type adjacent to the channel. This method enables adjusting the velocity of the process gas according to the optimum velocity for each category of concrete objects in order to unify the properties of the finished objects and optimize the total process time requirement.

Example 2

Curing System with Reversible Flow

A curing system was designed wherein the flow of the process gas is directed to channels between the discrete concrete objects as well as between discrete concrete objects and chamber components. The direction of flow in both the channels is reversible. In the envelopes or chambers capable of accommodating a plurality of discrete concrete objects arranged in an array as the fluid flows over these concrete objects. As the fluid flows over the plurality of the discrete objects, the conditions of the fluid, such as temperature, relative humidity or moisture content and velocity changes. After traversing a specific length, which is governed by the initial condition of the fluid, and properties of the plurality of discrete concrete objects, such as, bonding element to filler ratio, water content, degree of compaction and dimensions, the condition of the fluid in the channels between the chamber components and the channels between the discrete concrete objects becomes unsuitable for optimal curing. In other words, the temperature of the fluid drops and the relative humidity or moisture content of the fluid increases beyond a threshold suitable for the curing of the discrete concrete objects.

In some embodiments, the fluid is considered unsuitable for use when the temperature of the fluid is reduced below 60° C., or below 55° C., or below 50° C., or below 45° C., or below 40° C. or below 35° C., or below 30° C. or below 25° C.

In some embodiments, the fluid is considered unsuitable for use for curing when the moisture content of the fluid, expressed as relative humidity, is above 20%, or is above 30%, or is above 40%, or is above 50%, or is above 60%, or is above 70%, or is above 80%, or is above 90%.

However, by reversing the direction of the fluid flow at least once during the curing cycle, the length of the array of the discrete concrete objects that can be cured can be increased. In doing so, the discrete concrete objects located downstream, that gets exposed to the colder and fluid with higher moisture content are now exposed to a drier and fluid with lower moisture content for at least part of the curing cycle. In some embodiments, this length can be increased to double the length at which the conditions of the gas become unsuitable for the gas to be used for curing in the set-up with a uni-directional flow throughout the curing cycle. Overall, this concept helps with increasing the capacity of the envelope or chamber.

Figure 16:
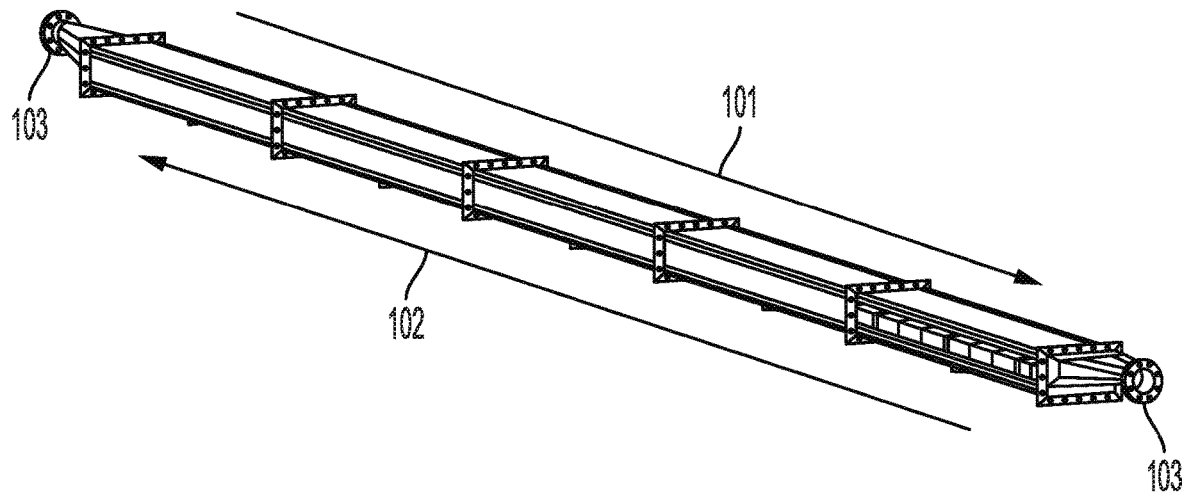
FIG. 16 shows an illustrative drawing of an exemplary curing system with reversible flow. The flow direction can be changed to follow the directions by arrow (101) and arrow (102). The flow and direction of the gas is controlled by an external condition system connected to the system at the flanges marked (103).

A large-scale drawing of an exemplary system is shown in FIG. 16. A close of drawing of the proposed system with concrete objects within is shown in FIG. 17.

Figure 17:
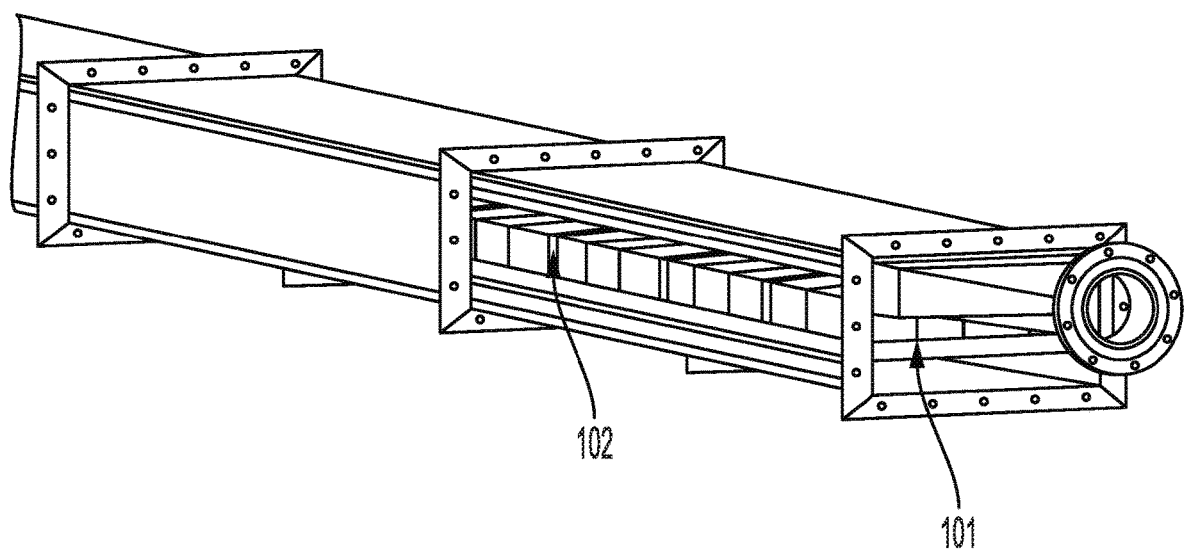
FIG. 17 shows an exemplary magnified view of a curing system with reversible flow. The gas inlet plenum is designed so that flow is distributed to the channels between concrete objects (101) and the channels formed by the outer surfaces of the concrete objects and the chamber walls (102).

In another embodiment, the products can be stacked on boards above one another as shown in FIG. 15 and included inside a modified version of the proposed system shown in FIGS. 16 and 17, wherein the chamber height is increased to accommodate multiple racks.

Example 3

Curing a Hollow-Core Slab Using the Desorption Isotherm Method

Mixing

A Sicoma TO8 Series planetary mixer (model MP 250/375 WWWSW) was used for mixing the components of the concrete mix design. The planetary speed was 18.5 RPM. Filler material in the form of 293.8 kg of ¼" Aggregate and 160.3 Kg of sand were dry-mixed for 90 seconds. Five Kg of water, 168 g of Glenium 7500 admixture (BASF) and 120 g of air entrainment admixture were added to the dry-mix and the combination mixed for an additional 90 seconds. Binder in the form of 80.1 Kg of Solidia cement (Solidia Technologies) (4% Pseudowollastonite, 19% Wollastonite, 13% Larnite, 2% Calcite and 62% amorphous oxides) was added to the wet material in the mixer along with an additional 16 Kg of water. The combination was mixed for an additional 90 seconds. The final moisture content of the mixture was found to be 3.68% as measured with a Sartorius MA100 moisture analyzer. A total of three such batches were transferred to an extruder for extrusion of a hollow-core slab.

Extrusion:

Two 40' long by ⅜" diameter steel cables (low relaxation 7-wire strand, Sumiden Wire Products Corp.) were tensioned to an elongation of 3" along the length of the steel extrusion bed. The cables were placed such as to locate one of them symmetrically between the slab bottom and cores 1 and 2; and the other symmetrically between the slab bottom and cores 5 and 6.

Figure 18:
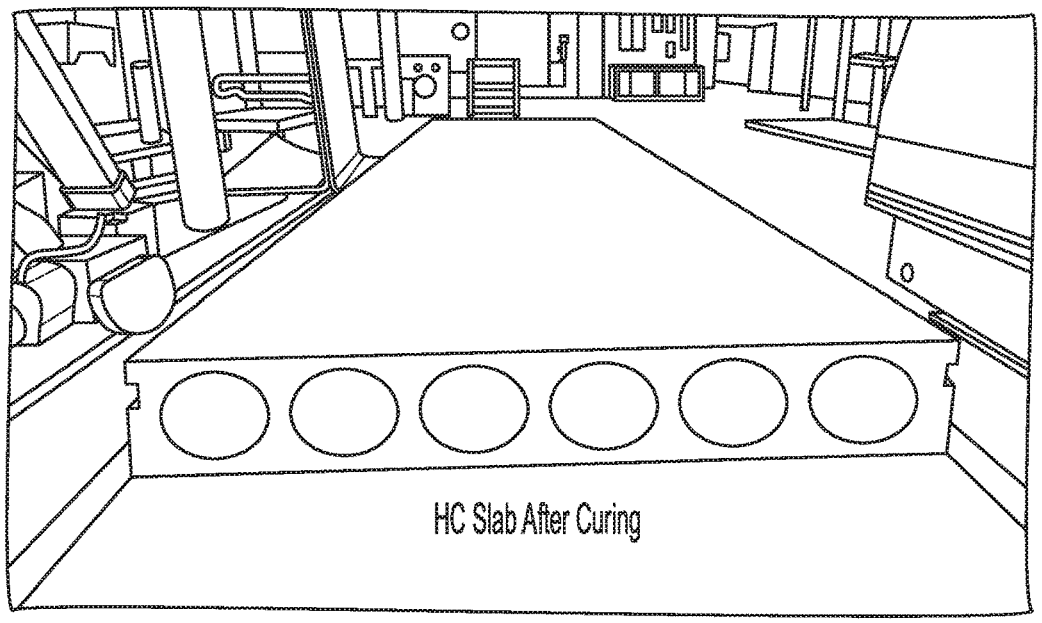
FIG. 18 shows an exemplary hollow-core slab made according to the invention.

A hollow-core slab was extruded on the steel bed by a commercial Elematic EL 600/8 extrusion machine using an auger speed of 55 RPM. The extruded slab was 18 feet long by 4 feet wide by 8 inches high and contained six (6" diameter) hollow cores. Adjacent cores were separated by a 1.25" thick wall. FIG. 18 shows a picture of the hollow-core slab.

Curing

Figure 19:
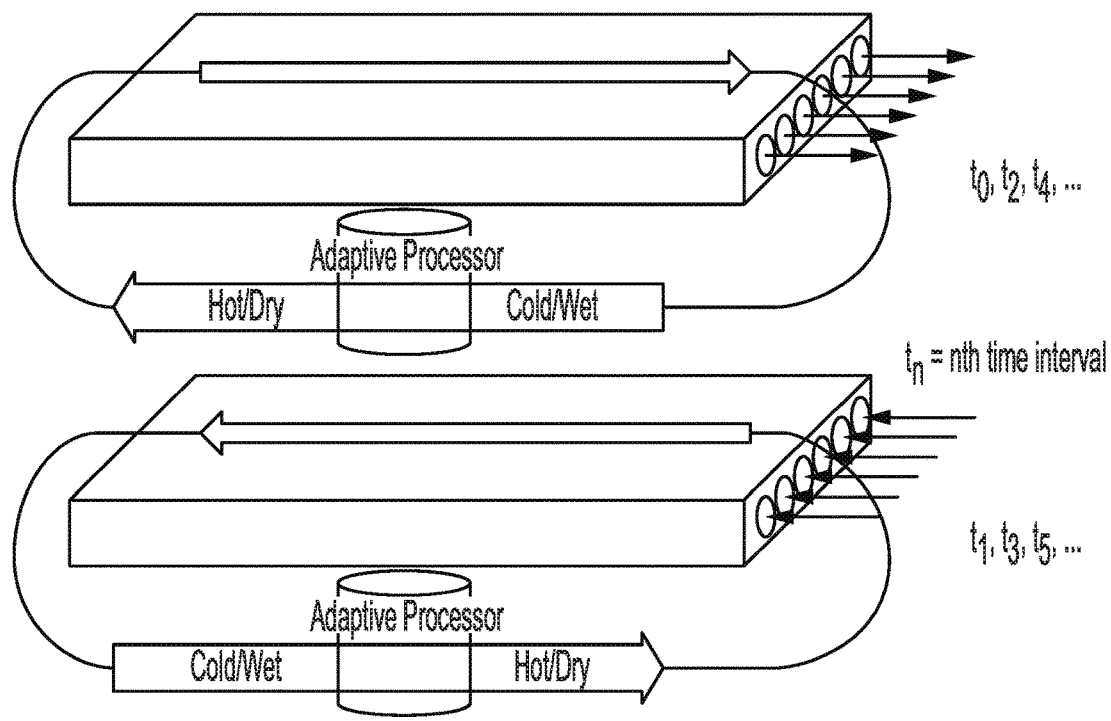
FIG. 19 depicts an exemplary embodiment of the invention, wherein the gas flow of $CO_2$ and water vapor may be controlled such as to oscillate in directions when passing through the interior ducts or channels and around the exterior surfaces to establish time averaged mirror symmetry along the length while maintaining side-to-side mirror symmetry. These symmetries reduce the effects of temperature and gas composition gradients that arise during the curing process.

FIG. 19 is a schematic drawing of the curing apparatus. The bed was heated by circulating hot water through pipes within the steel bed during the cure. The temperature of the heating water was maintained by a gas-fired boiler held at 81° C. The temperature at the top surface of the steel bed was around 49° C. Cold water from a chiller (maintained at 10° C.) was circulated through the condenser to remove moisture from the circulating gas stream. An electric heater (3.75 kW) was maintained at 87° C. to heat the dried circulating gas stream before it returns to the curing chamber. The speed of the circulation blower was controlled by a variable frequency drive. The initial blower speed was 30 Hz. Dry $CO_2$ was supplied on demand to the curing system through an Alicat mass flow controller. The curing chamber comprised the steel extrusion bed and a polyethylene sheet, which functioned as a canopy and separated the $CO_2/H_2O$ stream from the ambient atmosphere. The canopy covered the hollow-core slab and was stretched between support walls at each end of the slab. The canopy was sealed along the steel extrusion bed and to the end walls with magnetic strips and was inflated by the circulating gas stream. The differential pressure between the inside and the outside of the canopy was maintained slightly above atmospheric pressure (Differential Pressure=+0.2 inches-of-water-column). Each end wall of curing chamber had the same cross sectional shape as the slab except that the walls were 9.25" rather than 8" high. Each end wall served as the front of rectangular box forming a chamber with 1 gas entrance port opposite 6 holes through which gas entered or exited the curing chamber. The 6 holes were covered with a perforated metal sheet so that the end chamber acted as a plenum that functioned to distribute and smooth the gas flow into the curing chamber. One of the two ports belonging to a differential pressure transmitter was inserted through one end wall into the curing chamber. The other port was left open to the ambient atmosphere. The sampling probe of a NDIR $CO_2$ meter was inserted through the end wall at the other end of the curing chamber to monitor the $CO_2$ concentration in the chamber throughout the curing run. Two Vaisala Humidity/Temperature probes were placed within the curing chamber, one at each end just inside the end walls.

The curing chamber was purged for 10 minutes with $CO_2$ gas. The gas circulation was reversed every 60 minutes during the curing run. The blower speed was reduced to 15 Hz at 90 minutes into the cure, and then increased to 45 Hz at 209 minutes into the cure where it remained until the curing run was terminated at 490 minutes.

Figure 20:
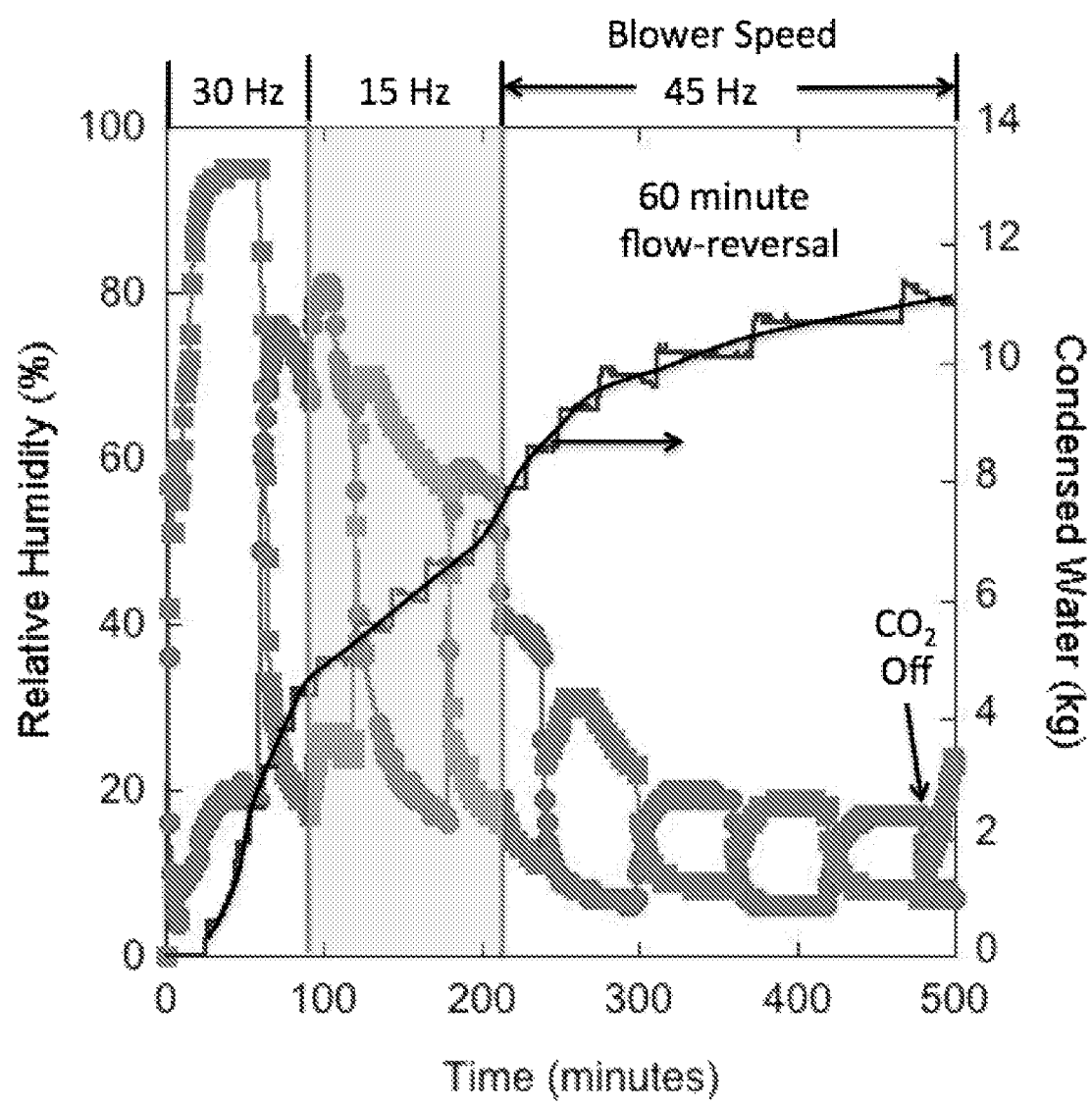
FIG. 20 shows an exemplary chamber humidity measurement at the end walls by the Vaisala sensors throughout the cure as well as the cumulative amount of condensed water collected throughout the run.

FIG. 20 shows the chamber humidity measured at the end walls by the Vaisala sensors throughout the cure as well as the cumulative amount of condensed water collected throughout the run.

The strength of the hollow-core slab was estimated using a rebound hammer at 44 points on the top surface of the slab. The rebound measures indicated an average compressive strength of 30 MPa.

Example 4

Curing a Hollow-Core Casting Using the Adsorption Isotherm Method

Mixing

The mix design consisted of six solid components: (1) 3/8" aggregate, 29% (2)¼" aggregate, 15% (3) 2 mm crushed quartz, 12% (4) construction sand, 20% (5) marble white 200, 11% and (6) NYCO 400 wollastonite 13%. The components were "dry" mixed in a Kercher Industries 12" lab-scale mixer for 2 minutes. Water (570 g) with gum additive was added to the dry components and the resulting mixture mixed an additional 4 minutes. More water (265 g) was added and the mixture mixed an additional 4 minutes. Finally, more water (260 g) was added and the mixture mixed an additional 2 minutes.

Casting

The wet mixture was cast in a 4"×4"×20" rectangular mold with the long dimension placed horizontally. A 2" diameter×20" long pvc pipe that had be wrapped in waxed paper was secured in the center of the mold so as to form a 2" diameter core along the length of the casting. The concrete mix was cast in 6 layers with 30 seconds of vibration at each layer except for the last, which was vibrated for 60 seconds.

Drying

The hollow-core casting was slowly dried to prevent cracking. It was allowed to air-dry over night and was then placed in a drying oven at 90° C. for 51 hours, followed by an additional 20 hours at 100° C. After drying, the hollow-core casting was removed from its mold and the pvc pipe removed from the core of the casting. The net weight of the hollow-core casting was 8769 grams.

Curing

Figure 21:
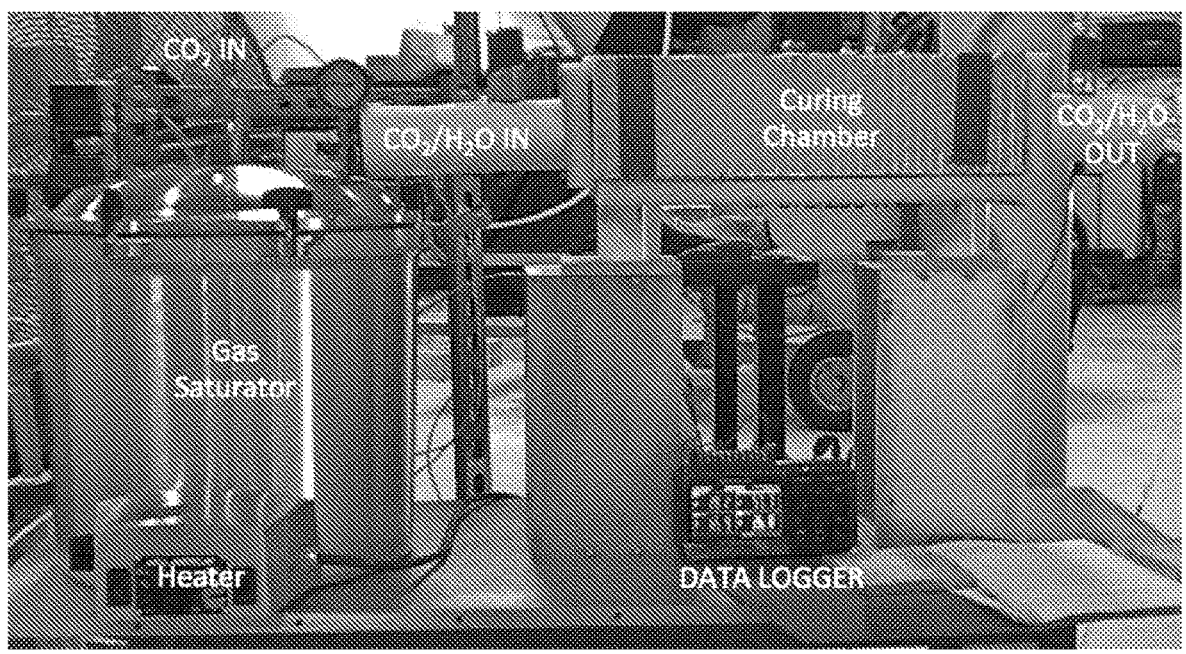
FIG. 21 shows an exemplary picture of the curing apparatus for curing a dry hollow-core casting.

FIG. 21 is a picture of the curing setup. A PVC pipe fitting was inserted into each end of the core with tube fittings screwed into the pipe fittings so that curing gases could be passed through the casting. The hollow-core casting was encased in 1" thick aluminum-foil-backed fiberglass insulation. One of the tube fittings from the core (the entrance tube assembly) was attached with ¼' stainless steel tubing to a gas saturator (heated vessel that contained water). The other tube fitting from the core (the exit tube assembly) was attached to a ¼" plastic tube that lead to a vent. Each tube assembly was fit with a thermocouple so that the temperature of the curing gas could be measured before and after passing through the core. Each tube assembly was insulated with fiberglass insulation.

The water in the saturator was maintained at 65° C. throughout the curing run. Carbon dioxide gas was bubbled through the water at 6.5 liters/minute to saturate the gas stream with water vapor. All of the heat and water for the curing reaction was carried into the hollow core by the saturated carbon dioxide stream. The temperature at the core inlet rose from 26° C. to 60° C. over a period of one hour where it stayed for the rest of the curing run. It took another 90 minutes for the temperature at the core exit to rise to 53° C. where it stayed for the rest of the curing period. The curing run was terminated after 20 hours.

Figure 22:
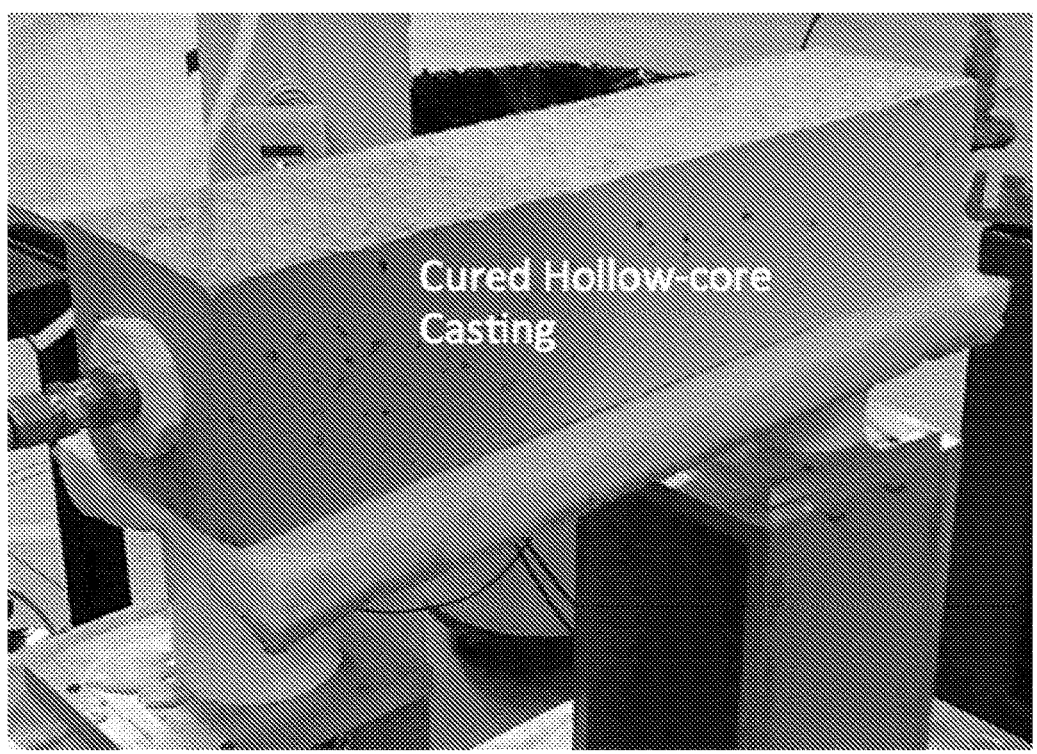
FIG. 22 shows an exemplary hollow-core casting that was cured in the apparatus of FIG. 21.

The insulation that surrounded the hollow-core casting during the curing run was removed. The first third of the casting (inlet end) appeared wet and darker on the outside than the remainder of the casting, which appeared lighter and dry (FIG. 22). The casting was dried completely in a drying oven to a constant weight of 8939 grams, for a gain of 170 grams due to carbonation. The average extent of carbonation was calculated to be 40% from the weight gain.

The dried hollow-core casting was cut in half to assess the uniformity of the cure, since the two ends of the casting were visually different. Some material was lost from the kerf on cutting through the casting and some material was lost from spalling of the outside edges of the cut caused by the saw blade. The spalling pattern was symmetrical and approximately the same on both halves of the costing thus the cutting losses were approximately the same for both pieces. The total weight of cutting losses amounted to 137 grams.

The inside edges (e.g., the core surface) cut cleanly, which suggests that the inside of the casting had reacted better than the outside and that the extent of reaction varied in a radial pattern around the core. The weight of the inlet half of the dried casting was 4429 grams while the weight of the outlet half of the dried casting was 4373 grams. Thus the mass remaining after cutting the slab was evenly distributed in the two halves (50.3% inlet end; 49.7% outlet end). Therefore the extent of carbonation was distributed evenly along the length of the hollow-core casting.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

Incorporation by Reference

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

Equivalents

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A system for manufacturing articles, comprising,
   an envelope or chamber and enclosed therein,
   a composite material distributed as a plurality of discrete carbonatable calcium silicate-based concrete objects, wherein the plurality of discrete concrete objects are arranged along a plurality of parallel planes; wherein,
   one or more ducts or channels are arranged between or through the plurality of discrete concrete objects forming a fluid transport system within the one or more ducts and channels and with an exterior of the plurality of discrete objects;
   optionally, one or more boards on which the plurality of discrete concrete objects are placed;
   one or more racks, tarps, walls or panels with planar, flat, convex or concave faces, that form one or more ducts or channels and facilitate a fluid flow profile in the fluid transport system.

2. The system of claim 1, comprising a fluid distribution component that controls the fluid flow profile of at least a portion of the envelope or chamber.

3. The system of claim 1, comprising a fluid distribution component that controls the fluid flow profile throughout the envelope or chamber.

4. The system of claim 1, wherein the fluid distribution component that controls the fluid flow profile throughout the envelope or chamber changes the direction of a gas flow at least once.

5. The system of claim 4, wherein the fluid distribution component that controls the fluid flow profile throughout the envelope or chamber changes the velocity of the gas flow at least once.

6. The system of claim 1, wherein the fluid distribution component comprises one or more of fluid inlets, outlets, plenums, or perforated plates, or combinations thereof.

7. The system of claim 1, wherein the envelope or chamber is made of a material selected from a metal, alloy, plastic, polymer, polymeric composite, ceramic composite, or combinations thereof.

8. The system of claim 1, wherein the envelope or chamber is made of a concrete material, or, steel, or tarp, or combinations thereof.

* * * * *